(12) United States Patent
Pellenc

(10) Patent No.: US 9,271,442 B2
(45) Date of Patent: Mar. 1, 2016

(54) ROTARY COUPLING HEAD USING CUTTING BLADES AND CUTTING DEVICES COMPRISING SUCH A COUPLING HEAD

(75) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 716 days.

(21) Appl. No.: 13/639,168

(22) PCT Filed: Apr. 18, 2011

(86) PCT No.: PCT/FR2011/000232
§ 371 (c)(1),
(2), (4) Date: May 21, 2013

(87) PCT Pub. No.: WO2011/131859
PCT Pub. Date: Oct. 27, 2011

(65) Prior Publication Data
US 2013/0269192 A1 Oct. 17, 2013

(30) Foreign Application Priority Data

Apr. 21, 2010 (FR) ...................................... 10 01690

(51) Int. Cl.
 *A01D 34/412* (2006.01)
 *A01D 34/73* (2006.01)
 *A01D 34/90* (2006.01)
(52) U.S. Cl.
 CPC ............ *A01D 34/412* (2013.01); *A01D 34/733* (2013.01); *A01D 34/90* (2013.01)
(58) Field of Classification Search
 CPC .................. A01D 34/412–34/42; A01D 34/46; A01D 34/49; A01D 34/52–34/62

USPC ......................................... 30/276; 56/12.7, 17
See application file for complete search history.

(56) References Cited

U.S. PATENT DOCUMENTS

| | | | |
|---|---|---|---|
| 3,320,733 A | 5/1967 | Kirk | |
| 3,877,146 A * | 4/1975 | Pittinger | ................ A01D 34/73 30/276 |
| 4,089,114 A * | 5/1978 | Doolittle | .............. A01D 34/416 30/276 |
| 4,118,865 A * | 10/1978 | Jacyno | ............... A01D 34/4166 30/276 |

(Continued)

FOREIGN PATENT DOCUMENTS

| | | |
|---|---|---|
| EP | 1570719 A1 | 9/2005 |
| EP | 1815732 A1 | 8/2007 |

(Continued)

OTHER PUBLICATIONS

International Search Report for corresponding International Application No. PCT/FR2011/000232.

*Primary Examiner* — Jason Daniel Prone
(74) *Attorney, Agent, or Firm* — Egbert Law Offices, PLLC

(57) ABSTRACT

A rotary coupling head for use with a portable cutting device has a blade-supporting housing, an axial motor drive shaft connected to the blade-supporting housing so as to be rotatable with the blade-supporting housing, an interchangeable cutting blade mounted on the blade-supporting housing so as to rotate with the rotation of the blade-supporting housing. The cutting blade is engaged around the drive shaft such that the cutting blade and the housing are axially displaceable along the drive shaft. A coupler on the housing is automatically actuated upon the axial displacement of the cutting blade and the housing on the drive shaft.

24 Claims, 24 Drawing Sheets

(56) References Cited

U.S. PATENT DOCUMENTS

| | | | | |
|---|---|---|---|---|
| 4,237,610 A | * | 12/1980 | Bradus | A01D 34/416 30/276 |
| 4,302,878 A | * | 12/1981 | Bonforte | A01D 34/73 56/12.7 |
| 4,374,465 A | * | 2/1983 | Comer | A01D 34/416 56/12.7 |
| 4,712,364 A | * | 12/1987 | Oxley | A01D 34/733 30/276 |
| 4,936,884 A | * | 6/1990 | Campbell | A01D 34/4168 30/276 |
| 5,271,212 A | * | 12/1993 | Anderson | A01D 34/736 56/12.7 |
| 5,622,035 A | * | 4/1997 | Kondo | A01D 34/733 30/276 |
| 6,032,369 A | * | 3/2000 | Tada | A01D 34/90 30/276 |
| 6,052,974 A | * | 4/2000 | Harb | A01D 34/416 30/276 |
| 6,055,798 A | * | 5/2000 | Fulmer | A01D 34/733 56/12.7 |
| 6,065,214 A | * | 5/2000 | Nagashima | A01D 34/6812 30/276 |
| 6,298,642 B1 | * | 10/2001 | Harb | A01D 34/416 30/276 |
| 6,439,088 B1 | * | 8/2002 | Eytchison | A01D 34/902 30/276 |
| 6,446,346 B1 | * | 9/2002 | Castleman | A01D 34/416 30/276 |
| 6,751,871 B2 | * | 6/2004 | Furnish | A01D 43/063 30/276 |
| 6,925,718 B2 | * | 8/2005 | Bartmann | B24B 23/02 30/276 |
| 6,925,789 B2 | * | 8/2005 | Lin | A01D 34/416 56/12.7 |
| 7,216,471 B1 | * | 5/2007 | Hassan | A01D 34/82 56/12.7 |
| 7,878,097 B2 | * | 2/2011 | Strader | A01D 34/733 30/276 |
| 8,869,369 B1 | * | 10/2014 | Roach | A01D 34/733 30/276 |
| 2004/0020060 A1 | * | 2/2004 | Peterson | A01D 34/4167 30/276 |
| 2004/0045166 A1 | * | 3/2004 | Hobday | A01D 34/14 30/276 |
| 2008/0282553 A1 | * | 11/2008 | Woody | A01G 3/0535 30/276 |
| 2011/0232106 A1 | * | 9/2011 | Andrews | A01D 34/4165 30/276 |
| 2012/0066912 A1 | * | 3/2012 | Ferrell | A01D 34/4166 30/276 |
| 2013/0205596 A1 | * | 8/2013 | Pellenc | A01D 34/416 30/122 |
| 2013/0283623 A1 | * | 10/2013 | Pellenc | A01D 34/4166 30/276 |
| 2014/0150267 A1 | * | 6/2014 | Sowell | A01D 34/4166 30/276 |
| 2015/0223395 A1 | * | 8/2015 | Pellenc | A01D 34/4161 30/276 |
| 2015/0230402 A1 | * | 8/2015 | Grande | A01D 34/4167 30/276 |

FOREIGN PATENT DOCUMENTS

| | | |
|---|---|---|
| EP | 2394503 A1 * | 12/2011 |
| FR | 2959152 A1 * | 10/2011 |
| WO | WO 2011131859 A2 * | 10/2011 |

* cited by examiner

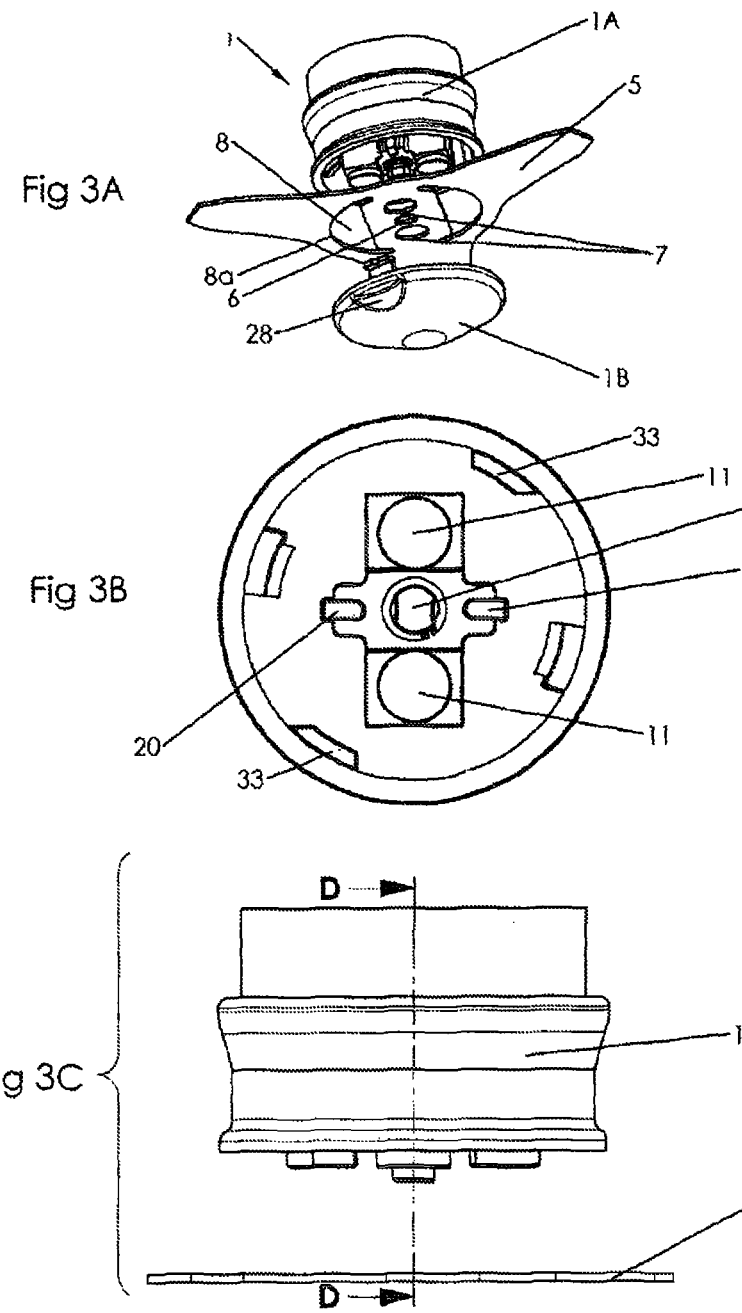

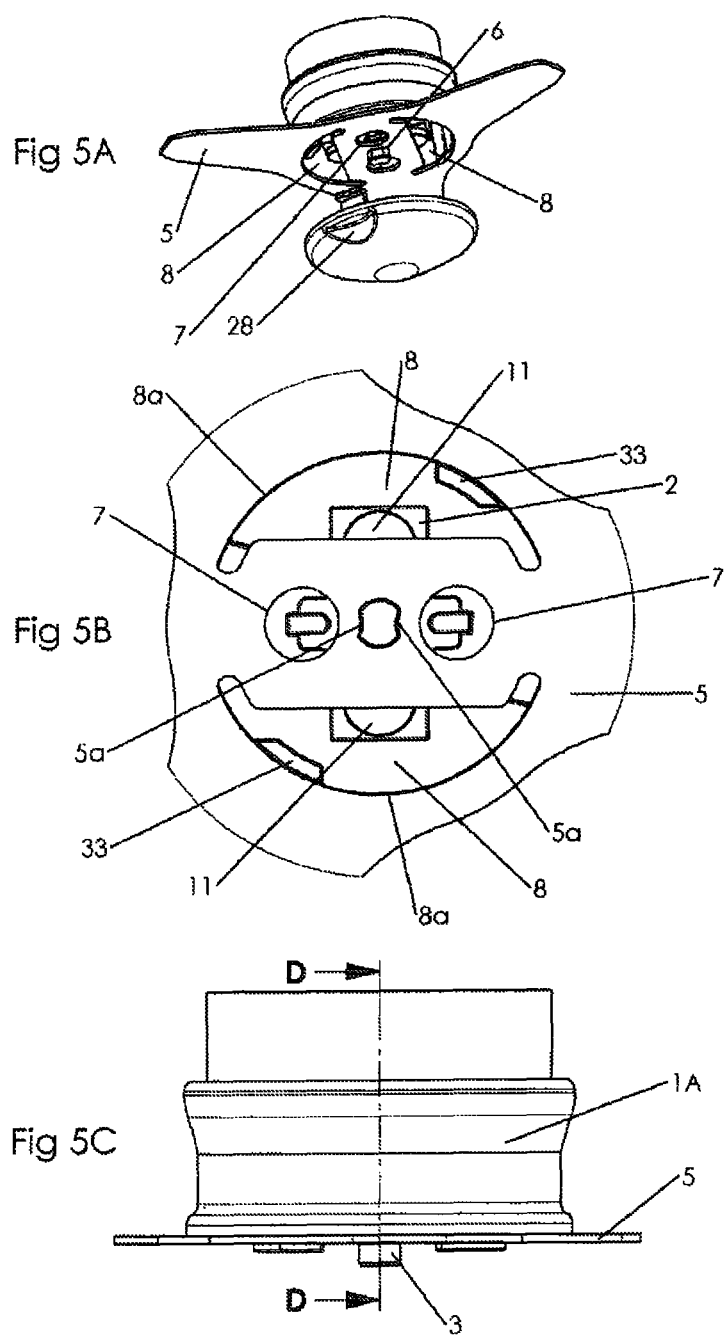

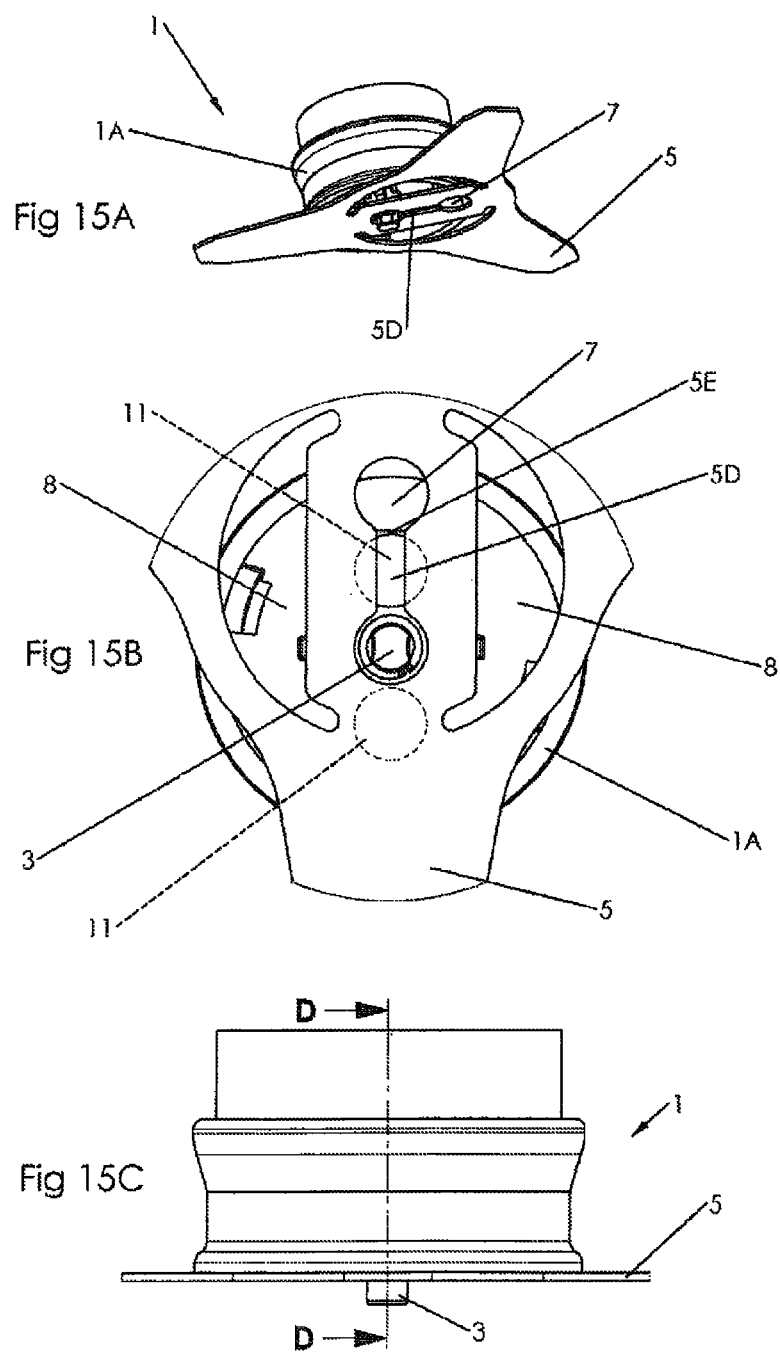

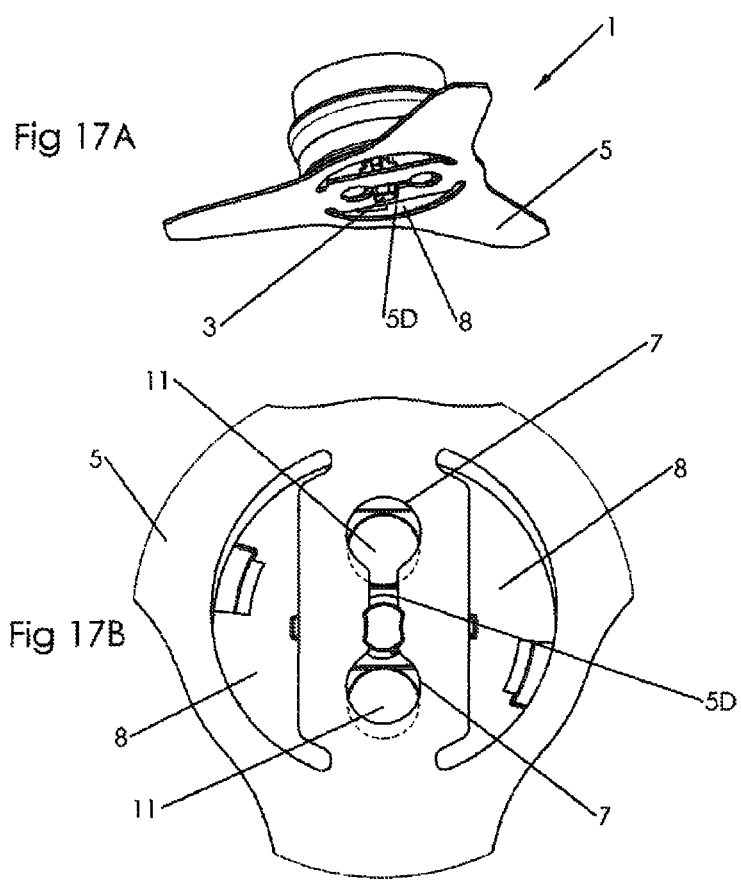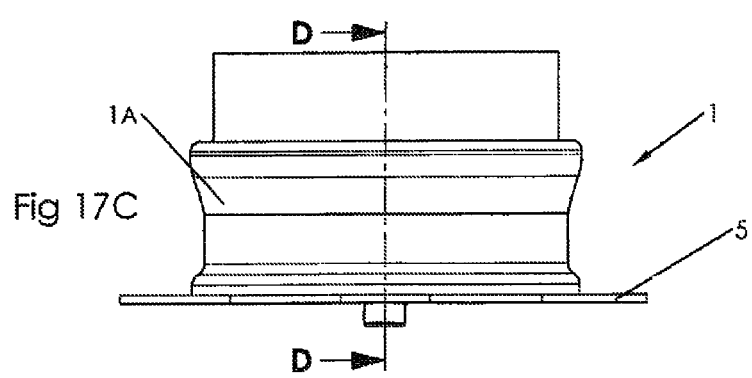

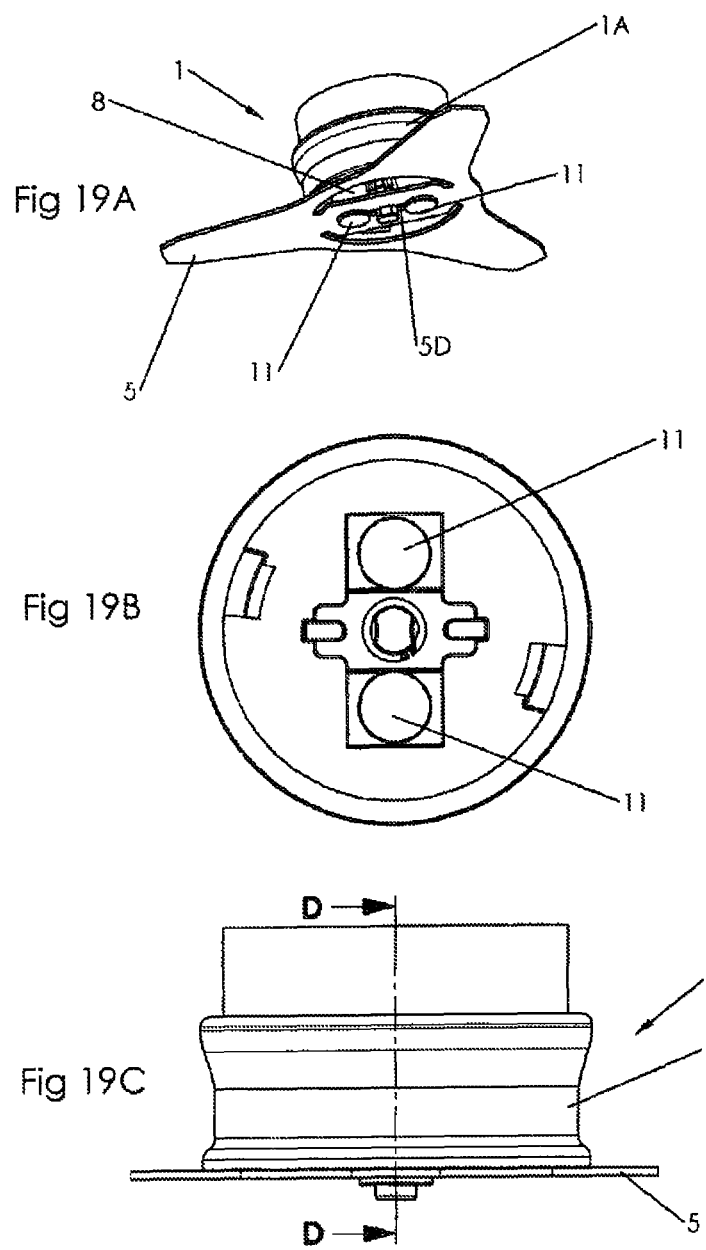

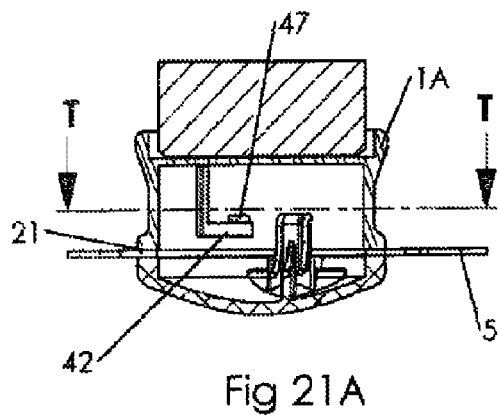
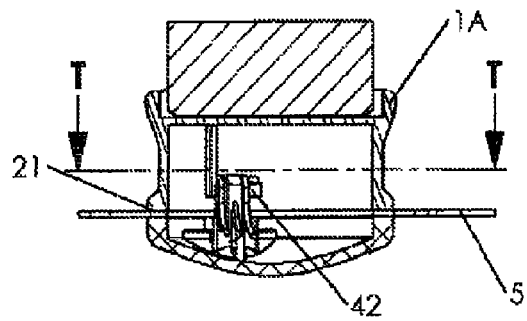
Fig 21A  Fig 21B
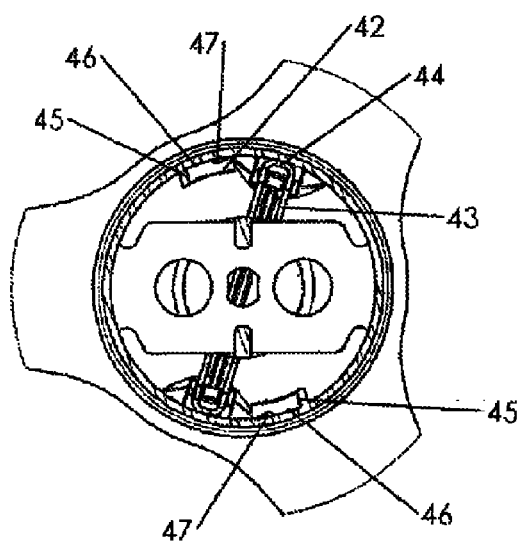
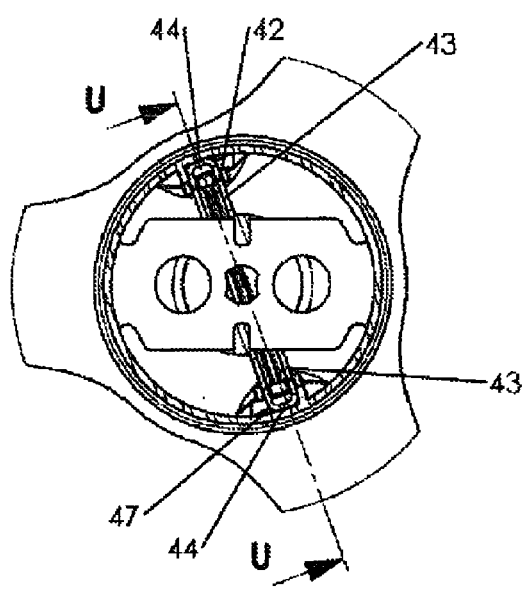
Fig 21C  Fig 21D

ROTARY COUPLING HEAD USING CUTTING BLADES AND CUTTING DEVICES COMPRISING SUCH A COUPLING HEAD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A MINT RESEARCH AGREEMENT

Not applicable.

REFERENCE TO AN SUBMITTED ON COMPACT DISC

Not applicable.

BACKGROUND OF THE INVENTION

1. Field of the Invention

The present invention concerns a rotary cutting head using cutting blades. It is advantageously intended for equipping portable cutting devices such as grass cutters, edge cutters, brush cutters, motorized, mowers, hedge trimmers and the like.

The invention also concerns portable cutting devices fit for being equipped with the cutting head disclosed in the following description.

2. Description of Related Art Including Information Disclosed Under 37 CFR 1.97 and 37 CFR 198

Portable motorized devices equipped with such cutting heads are currently used by professionals as well as by private persons, for example, for brush clearing, grass or lawn mowing.

These cutting heads are mounted to the distal end of a handle equipped with a U-shaped or dual handle for guiding and controlling the motor for the rotary drive of said cutting heads, the devices making use thereof may be equipped with a ring for attaching a carrying harness.

A cutting head of this kind uses a cutting blade made of metal or a composite material, and which may have various shapes: with three branches or lobes, circular (toothed disc or circular saw), or any other shape. Most often, these cutting blades are attached in a removable manner at the end of a handle, but this manner of fastening requires, on the one hand, knowledge of the specific principal of 'left hand thread' assembly and the use of special tools or not.

Document EP-1815732 describes a cutting head of a lawnmower featuring a rotary blade-supporting housing constituted by the assembly of an upper and a lower shell, this cutting head comprising a number of cutting blades that are independent of each other (four cutting blades according to the example shown), mounted on equidistant pivots borne by the lower shell. These vertical pivots are each positioned at equal radial distance from the axis of the shaft providing the rotary drive of the housing and they extend upward, parallel to said drive shaft. The positioning of the blades relative to their respective pivots is obtained by means of the upper shell locking itself on a central hub of the lower shell through the intermediary of a bayonet attachment.

The cutting head described in document EP 1815732 utilizes a number of narrow cutting blades with poor resistance to shocks caused by hard objects; the successive placement of each of these blades and to a certain extent, their removal, are difficult and necessarily long operations.

These inconveniences are encountered in the cutting head of the lawnmower described in document U.S. Pat. No. 3,320,733 which features two cutting blades that are independent of each other and mounted, diametrically opposed, on equidistant pivots borne by a disk driven in rotation by an axial drive shaft, these vertical pivots being placed, each, at equal radial distance from the drive shaft.

BRIEF SUMMARY OF THE INVENTION

The aim of the present invention is to secure and simplify the necessary manipulations for effecting the installation or removal of the cutting blades, so that these operations can be done easily and quickly, without the need for any tool, no matter how basic.

According to the invention, this aim has been achieved thanks to a device comprising a rotary cutting head and an interchangeable cutting blade, fitted in a complementary manner to be integral in rotation, such a cutting head featuring means for coupling it to the motor of a cutting device which may be a thermal motor, or preferably, an electric motor.

According to a first characteristic disposition, the rotary cutting head according to the invention comprises an exterior, blade-supporting housing integral in rotation with an axial motor drive shaft and an interchangeable cutting blade driven in rotation with said blade-supporting housing, this cutting head being remarkable in that the drive shaft, the blade-supporting housing and the blade are tined so that it is possible to engage the cutting blade around the drive shaft, to move it axially on said drive shaft, to a position in which it is possible to impart to it an angular or a linear movement, the blade-supporting housing and the cutting blade being provided with complementary coupling means that are automatically actuated following this movement, so that it is possible to perform manually and without a tool: the placement, change, centering, axial positioning of said blade relative to the drive shaft as well as the rotational coupling of said blade to the blade-supporting housing, by an axial displacement combined with an angular or linear displacement of said blade relative to the drive shaft, up to the activation of an automatic jaw coupling achieved between said blade and said blade-supporting housing.

According to another characteristic disposition, the cutting head according to the invention features a blade support seated in the exterior blade-supporting housing, and integral in rotation of the axial drive shaft and said support housing, said blade support and the cutting blade being provided with complementary coupling means in automatic rotation of said blade and said drive shall, this blade support being able to be axially displaced along said drive shaft to obtain the automatic jaw coupling between the blade and the blade-supporting housing. According to an advantageous embodiment, the cutting head comprises one or several of the following characteristics:

the exterior housing is constituted by at least two parts, namely an upper part and as lower part which is assembled in a removable manner to the base of the upper part, the cutting blade is provided with an axial or central passage and, inserted between said upper and lower parts, the blade support is integral in rotation with said housing and traversed by an axial drive shaft integral in rotation with said blade support, and the upper part of which is fitted to enable its rotational drive by a motor;

the blade support is mounted with an aptitude of axial movement, relative to said housing and said drive shaft;

the blade support and the cutting blade are provided with complementary means of positioning, and rotational coupling of the latter, these means being able to be decoupled, from their active position by the simultaneous manual application, to said housing and said blade support, of relative convergent axial movements;

the cutting blade and the distal portion of the drive shaft are provided with complementary means of axial blocking;

the blade support and the blade are united by means of automatic coupling when said blade is positioned on said blade support; and the means of automatic coupling or jaw coupling devices comprise on the one hand, retractable coupling studs located on the underside of the blade support and subjected to the pushing action of an elastic means tending to push them back into the coupling position, and, on the other hand, orifices made in the central part of the blade and in which said coupling studs can be engaged.

Besides the fact that the cutting head according to the invention offers an advantageous solution to the problem evoked earlier, its other particular advantage is a very simplified construction which favorably influences its cost and facilitates its maintenance; on the other hand, it allows replacing damaged or dull cutting blades with great ease and rapidity.

According to another characteristic disposition, the central part of the blade is constituted by cutouts and solid parts, two of these cutouts constituting coupling orifices, this fitting of the central part of the blade making it possible: either to maintain the coupling studs and coupling orifices in the distant position resisting the pressure exerted by the elastic means, or the automatic engagement of said studs in the coupling orifices under the pressure of said elastic means.

According to an advantageous embodiment, the means of positioning and coupling of the cutting blade to the blade support comprise, on the one hand, two retractable coupling studs located on the surface of said blade support, on both sides of the axial opening, made in the latter for the passage of the drive shaft, and, on the other hand, two spaced orifices made on either side of the axial passage of the blade, enabling the engagement of the distal portion of the drive shaft.

According to another embodiment, the coupling orifices of the blade are connected by a slot or oblong opening, the ends of which join with said coupling orifices, said slot allowing for the passage of the distal portion of the drive shaft.

According to another characteristic, disposition, the rotational coupling of the interior blade support and the exterior housing is achieved by means of drive fingers integral with the internal face of the upper partition of the exterior housing and oriented parallel to the rotational axis of said exterior housing, inside of which these drive fingers are engaged with an aptitude of sliding in guiding, and coupling grooves made laterally in the blade support, preferably, in at least two sides opposite the latter.

According to an embodiment, the drive shaft traverses the blade support, the traversing portion of said shaft and the axial passage made in said blade support presenting a complementary profile that has been adapted to enable the rotational drive of the cutting head.

According to another characteristic disposition, the rotary cutting head comprises means for maintaining the blockage of the blade support on the drive shaft, in the coupled position.

According to an advantageous embodiment, the means for axial blockage of the cutting blade on the drive shaft comprise, on the one hand, an axial opening on the cutting blade, and, on the other hand, a ring-shaped groove featured by the distal portal of the drive shaft at its end, the end portion of said drive shaft presenting, beginning at said groove, a circular shape provided with two diametrically opposed female longitudinal grooves, whereas the axial opening of the cutting blade presents a male shape identical to that of the profile of said end portion.

Thanks to this disposition, after rotation of the cutting blade by 90° relative to the drive axis, said cutting blade is blocked axially on the drive shaft, because of a single possibility of assembly, thus excluding any possibility of error or indecision.

According to another embodiment, the means for positioning and blocking the cutting blade on the distal portion of the drive shaft comprise, on the one hand, a ring-shaped groove featured by the distal portion of the drive shaft at the distance of its distal end, and, on the other hand, a slot or oblong opening made in the central part of the blade and presenting a width smaller than the diameter of said distal portion, this width being provided to enable the engagement and slide of the longitudinal edges of said slot in the ring-shaped groove, so that said cutting blade is immobilized in axial translation.

According to another characteristic disposition, the displacement of the blade support in active position occurs automatically under the action of an elastic means of return, preferably constituted by a spring acting in compression and interposed between an upper partitioning of the exterior housing and the blade support.

According to another characteristic disposition, the lower edge of the upper part of the exterior housing and the cutting blade are provided with complementary positioning means.

Advantageously the complementary positioning means of the exterior housing and of the cutting blade comprise, on the one hand, two oblong holes delimited by an arched external edge and located in the central portion of the cutting blade, on both sides and at equal distance from the alignment of openings present on the blade and, on the other hand, diametrically opposed centering and stop cleats provided on the base of said upper part.

According to another characteristic disposition, the edge of the locking nose and the rounded shoulder are provided with complementary means for automatic blocking at the end of the rotational movement of the housing pans.

According to a preferred embodiment, these complementary means for automatic blocking comprise a catch on the upper face of the shoulders and a notch provided in the outside edge of the nose.

BRIEF DESCRIPTION OF THE DRAWINGS

The aforementioned aims, characteristic dispositions and advantages and still more will become clearer from the following description and the attached drawings in which:

FIG. 3A is a perspective view showing the first phase of positioning, manually, a metal blade on or against the lower face of the upper part of the exterior housing.

FIG. 3B is a bottom view of FIG. 3A, after retraction of the cutting blade and of the sliding howl.

FIG. 3C is an exterior exploded view of FIG. 3A without the sliding howl.

FIG. 5A is a perspective view analog to FIG. 3A showing the second phase of positioning of the metal blade.

FIG. 5B is a bottom view of FIG. 5A without the sliding bowl.

FIG. 5C is an exterior view of FIG. 5A without the sliding bowl.

FIG. 15A is a perspective view analog to FIG. 13A showing the second phase of positioning the metal blade.

FIG. 15B is a bottom view of FIG. 15A without the sliding bowl.

FIG. 15C is an exterior view of FIG. 15A without the sliding bowl.

FIG. 17A is a perspective view analog to FIG. 13A showing, the third, phase of positioning, the metal blade.

FIG. 17B is a bottom view of FIG. 17A, with the sliding bowl moved.

FIG. 17C is an exterior view of FIG. 17A without the sliding bowl.

FIG. 19A is a perspective view analog to FIG. 13A showing the fourth phase of positioning the metal blade, in the blocked position.

FIG. 19B is a bottom view of FIG. 19A.

FIG. 19C is an exterior view of FIG. 19A without the sliding bowl.

FIG. 21 is a detail view and axial cross-section of the cutting head along line A-A of FIG. 213 in a second constructive disposition.

FIG. 21A is a cross-section along line F-F of FIG. 21 with the lower part 1B of the lower housing unblocked.

FIG. 21B is a cross-section along line F-F of FIG. 21 with the lower part 1B of the lower housing blocked.

FIG. 21C is a cross-section and plan view along line T-T of FIG. 21A.

FIG. 21D is a cross-section and analog plan view along line T-T of FIG. 21B.

Reference is made to these drawings to describe interesting, although by no means limited examples of embodiment of the cutting head according to the invention.

DETAILED DESCRIPTION OF THE INVENTION in the following disclosure and in the claims, words such as 'high', 'low', 'upper', 'lower', 'lateral', . . . are used in reference to the position of the cutting head in operation, in order to facilitate the description of the invention. Therefore these words do not have any restrictive character.

Figure 4A:
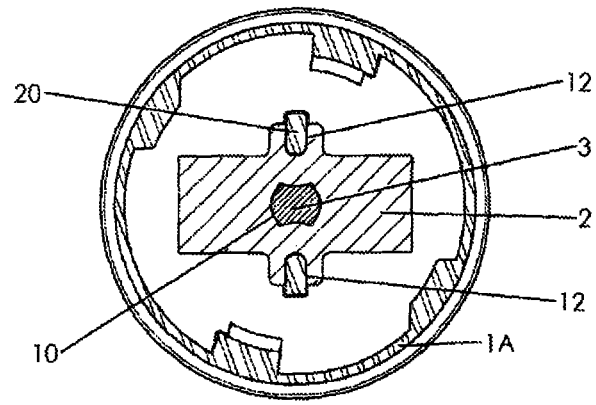
FIG. 4A is a bottom view and cross-section along line E-E of FIG. 4B.
Figure 4B:
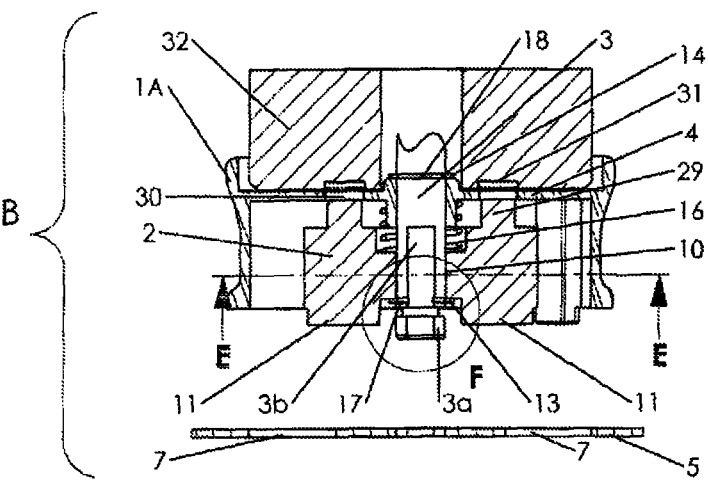
FIG. 4B is a cross-section along line D-D of FIG. 3C.
Figure 4C:
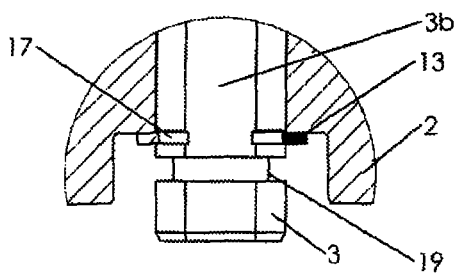
FIG. 4C is a detail view according to mark F of FIG. 4B.

The cutting head according to the invention comprises an exterior envelope or exterior housing 1 constituted by at least two parts, namely an upper part of a general cylindrical shape 1A and a lower part of essentially hemispherical or conical shape 1B called the 'sliding bowl', assembled in a removable manner to the base of the upper part inside this exterior housing is mounted a blade support 2 (FIGS. 4A, 4B, 4C).

This blade support 2 is integral in rotation of the exterior housing 1 and this assembly is fastened to coupling means for connecting it to the drive shaft of a thermal motor or, preferably, of an electric motor, or a bell crank equipping the portable cutting device.

This means is preferably constituted by an axial drive shaft 3 extending externally in the upward direction, above a partitioning 4 provided at the upper part of the exterior housing.

The blade support 2 can be displaced axially along the drive shaft 3.

The cutting head uses an interchangeable cutting blade 5 between the two parts 1A-1B of the exterior housing 1.

This cutting blade may have various dimensions and shapes: for example with three radial or three-pronged branches (as shown), circular (toothed disc or circular saw) or any other shape. It may be made of any material presenting the necessary qualities of hardness and of wear resistance, for example of tempered steel, composite material, rigid plastic material, etc. It may be double-edged and thus reversible.

Figure 7A:
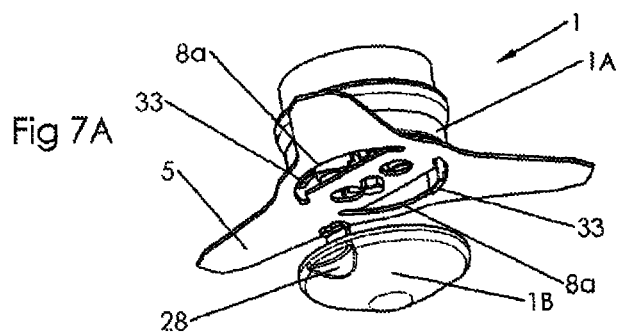
FIG. 7A is a perspective view showing the third phase of positioning of the metal blade.
Figure 7B:
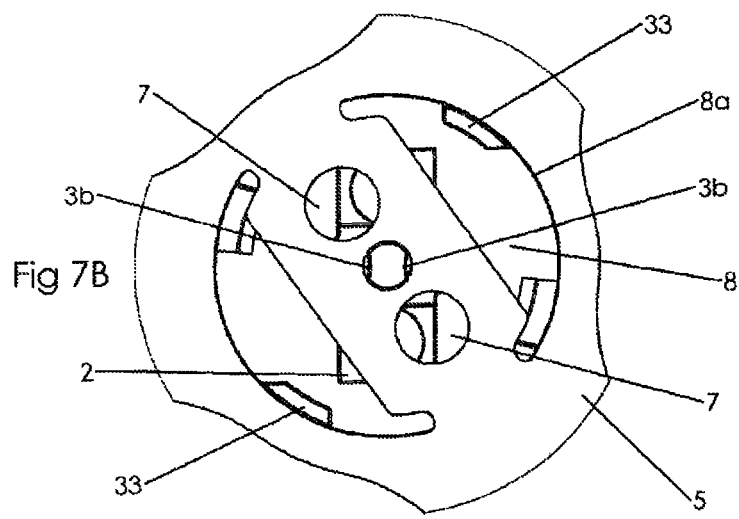
FIG. 7B is a bottom view of FIG. 7A, with the sliding bowl removed.

Two embodiments of this blade are described, in the present disclosure (FIGS. 7A-7B; 15A-15B).

According to a characteristic disposition of the invention, the central part of the cutting blade presents several openings or oblong holes, such as:
- an axial opening 6 for coupling to the drive shaft 3;
- two orifices 7, preferably of circular shape, for coupling to the blade support 2, these orifices being placed at equal distance from the axial opening 6 and diametrically opposed relative to it;
- two oblong holes 8 delimited by an external circular edge 8*a*, positioned on both sides of the alignment of openings 7, 6, 7 and having as a center the rotational axis of the cutting head, to allow centering of the cutting blade 5 relative to the drive shaft 3, as well as the assembly of the upper part 1A of the exterior housing and the lower part 1B of the latter, through said blade 5 positioned on the distal end of the drive shaft.

The blade support 2 features an axial passage 10 traversed by the lower portion of the axial shall 3; it is provided, on the underside, with two coupling, studs 11 positioned at equal distance from the axial passage 10 and diametrically opposed relative to said passage. These coupling studs 11 integral in translation of the blade support 2 present, preferably, a cylindrical shape and a significantly greater height than the thickness of the blade. They are shaped and dimensioned so they can automatically engage in the orifices 7 of the cutting blade 5.

According to another embodiment, the openings of the central part of the cutting blade may be constituted by:
- a median, straight, longitudinal slot or oblong hole 5D oriented diametrically and
- two orifices 7 into each of which goes one of the ends 5E of the slot 5D.

The two orifices 7 cooperate with the coupling studs 1 of the blade support 2, to obtain the removable fastening of the blade of said blade support.

The slot 5D presents a width smaller than the diameter of the distal part 3A of the drive shaft 3. This width is such that it allows sliding of the longitudinal edges of the slot in a ring-shaped groove 19 described further down in this disclosure and which is a feature of the distal portion 3A of the drive shaft 3 at the distance of its distal end.

The blade support 2 is integral in rotation, on the one hand, of the drive shaft 3 and, on the other hand, of the exterior housing 1, whereas it is mounted with an aptitude of relative translation of limited amplitude, on the one hand, along said drive shaft and, on the other band, in the upper part 1A of said exterior housing.

In other words, the drive shaft 3, the blade support 2, and the exterior housing 1 are integral in rotation, whereas the blade support is mounted with a capability of translation of limited amplitude (in the order of about ten millimeter) relative to the assembly constituted by the exterior housing 1 and the drive shaft 3.

According to the example of embodiment shown, the drive shaft 3 traverses the axial passage 10 made in the blade support 2, and the traversing portion 3B of the shaft 3 and said axial passage 10 present a complementary profile adapted for enabling the rotational drive of said support and, consequently, of the exterior housing 1 of the cutting head.

Means are provided to limit the amplitude of axial translation of the blade 2 on the traversing portion 3B of the drive shaft 3. These means comprise, for example, two circlips 13, 14 engaged in the ring-shaped grooves 17, 18 provided on the drive shaft 3.

According to one embodiment, the coupling in rotation of the interior blade support 2 and of the exterior housing 1A is achieved through drive fingers 20 integral with the internal face of the upper partition 4 of the exterior housing 1A and oriented, parallel to the axis of rotation of the cutting head, in the direction of the inside of the head, these drive fingers 20 being engaged, with an aptitude of sliding in the grooves 12 made in the blade support 2, preferably in at least two opposing sides of said support, and, more precisely, in the large sides of the latter.

An elastic means tends to permanently move the blade support 2 away from the upper partitioning 4 of the exterior housing 1A in the direction of the distal end 3A of the drive shaft 3. This elastic means thus tends to push back the coupling studs 11 into active position, according to which they find themselves engaged in the coupling orifices 7 of the cutting blade 5 installed on said distal end, so as to obtain a claw coupling between said cutting blade and said blade support.

According to a preferred embodiment, this means is constituted by a spring 16 acting in compression and interposed between an upper partitioning 4 of the exterior housing 1A and the blade support 2 so as to enable the automatic return of said blade support and the studs 11 in the coupling position with the blade.

Figure 6A:
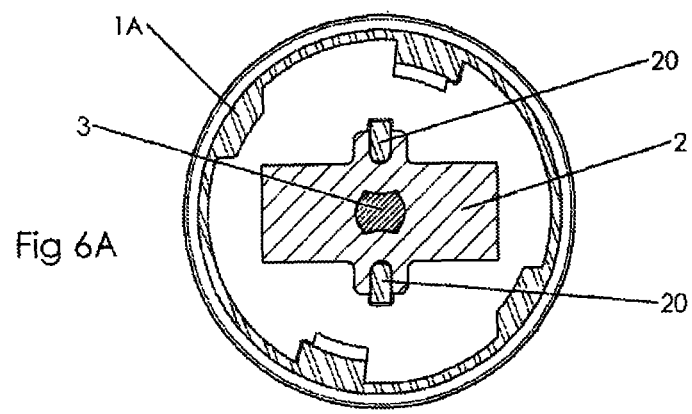
FIG. 6A is a detail view and cross-section along line F-F of FIG. 6B.
Figure 6B:
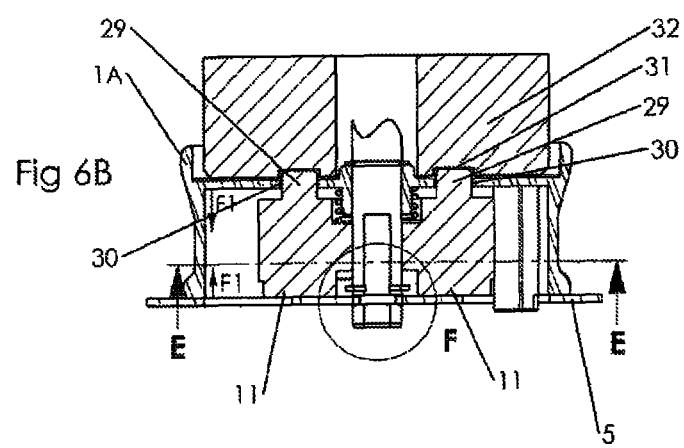
FIG. 6B is a cross-section along line D-D of FIG. 5C.
Figure 6C:
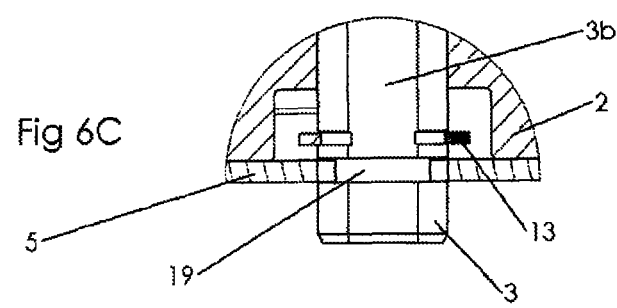
FIG. 6C is a detail view according to mark F of FIG. 6B.
Figure 10A:
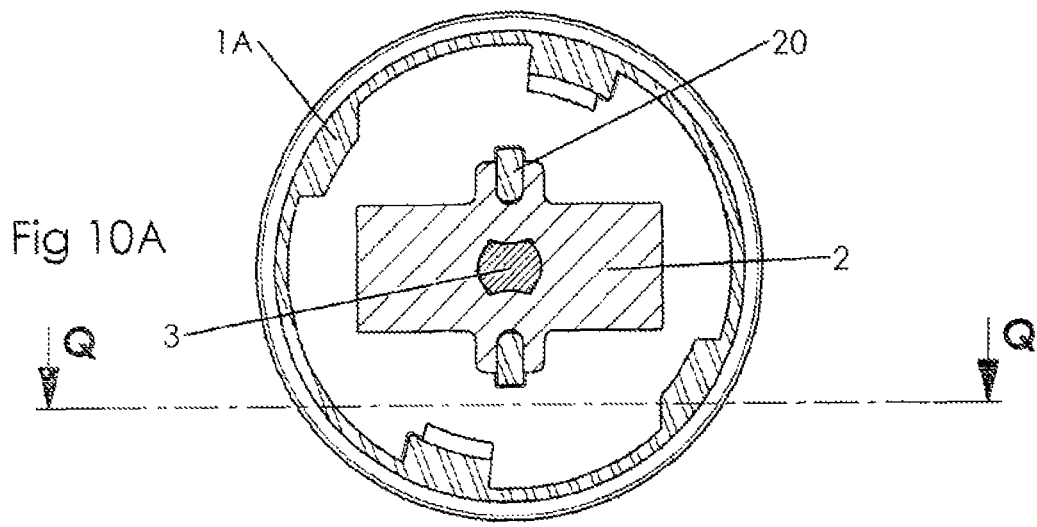
FIG. 10A is a cross-section along line E-E of FIG. 10B.
Figure 10B:
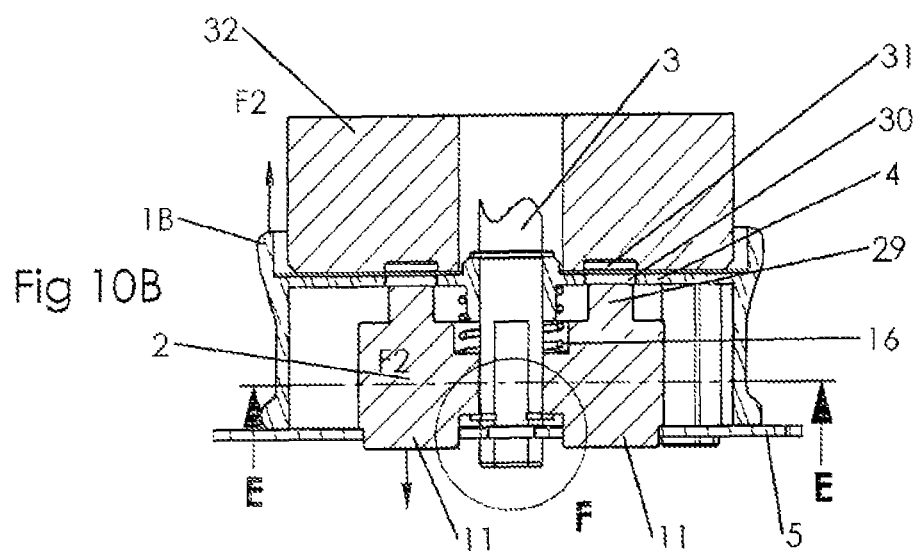
FIG. 10B is a cross-section along line D-D of FIG. 9C.
Figure 10C:
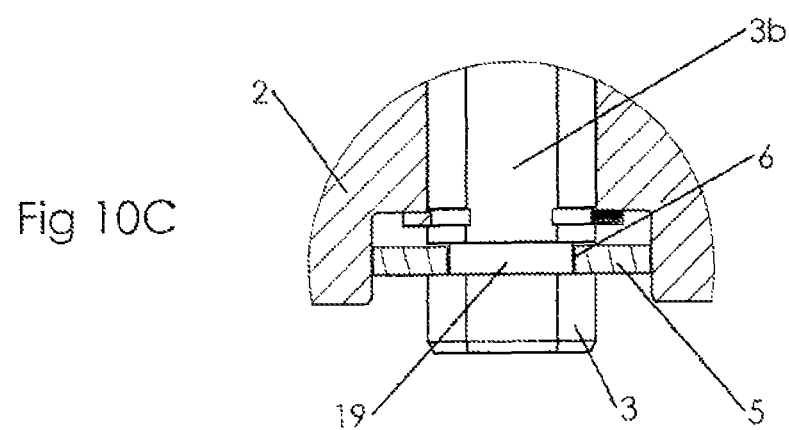
FIG. 10C is a detail view according to mark F of FIG. 10B.

It is clear that the simultaneous application of convergent axial movements (arrow F1, FIG. 6B) to the exterior housing 1A and to the blade support 2 seated inside this housing, makes it possible to bring said blade support closer to the upper partition 4 of said exterior housing 1A and thereby the cancellation of the coupling studs 11 and the decoupling of the blade, whereas the simultaneous application of divergent axial movements (arrow F2, FIG. 10B) to said exterior housing 1A and to said blade support 2 enables the engagement of the coupling plots 11 in the coupling orifices 7 of the blade.

According to an important characteristic of the invention, the convergent axial movements (arrow F1) of the exterior housing 1A and of the blade support 2 are obtained by the application of a manual force, whereas the simultaneous application of divergent axial movements (arrow F2) results from the automatic return action of the spring 16.

According to another advantageous embodiment, the means enabling the axial blocking of the cutting blade 5 on the drive shaft 3 comprise, on the one hand, an axial opening 6 on the cutting blade and, on the other hand, a ring-shaped groove 19 featured on the distal portion 3A of the drive shaft 3, at the distance of its end, the end portion of said drive shaft 3 presenting, beginning at said groove 19, a circular shape provided with two diametrically opposed female longitudinal grooves 3B, whereas the axial opening 6 of the blade 5 presents a male form identical to that of the profile of said end portion.

More precisely, the axial opening 6 of the cutting blade 5 presents at least two diametrically opposed lobes 5A of a shape or profile identical to those of the female grooves 3B, these lobes 5A are protruding in the axial opening 6, with an orientation relative to the two coupling holes 7 such that they are offset by about 90° relative to the drive studs 11 of the blade support 2 at the moment when the cutting blade is engaged on the part 38 of the drive shaft 3. These lobes 5A can occupy two extreme angular positions, either a first position enabling, the sliding of the lobes 5A in the grooves 3B and, consequently, the sliding of the cutting blade 5 and of the blade support 2 in the direction of the end of the drive shaft 3, along the distal portion 3A, and a second position where the lobes 5A are engaged, by a rotation of about 90° of the cutting blade 5, in the groove 19 of the drive shaft 3 with the effect of preventing any axial movement of the blade 5 and to enable the studs 11 of the blade support 2 to engage automatically, under the force of the spring 16 in the coupling orifices 7 of the cutting blade in order to obtain, at the end of this movement, the function of rotational drive of said blade.

According to another embodiment, the means enabling the blockage of the cutting blade 5 on the blade support 2 comprise, on the one hand, in the median part 5C of the blade, a straight longitudinal slot diametrically oriented or an oblong hole 5D. This slot or oblong hole opens, at each of its ends, in one of the orifices 7. The two orifices 7 enable the descent and, then, the engagement of the studs 11 of the blade support 2 at the moment when the cutting blade is pushed manually and in linear fashion until the blade comes to rest on the inside face of the exterior housing 1A. At the same time as this rest of the blade 5 on the inside face 21 of the exterior housing 1A, the edges 5F of the oblong hole 5D find themselves facing the ring-shaped groove 19 made in the distal part of the drive shaft 3. A manual linear force of blade 5 is applied until the orifices 7 meet up with the studs 11 of the support 2 which, under the action of the compression spring 16 enables the automatic engagement of said studs 11 in said orifices 7 of the blade.

As indicated previously, a retaining circlip 13 is installed in the groove 17 in order to limit the axial course of the blade support 2 on the drive shaft 3, while avoiding any dislocation of the drive shaft 3 relative to said blade support 2.

The rigid assembly of the upper 11 and lower 1B parts of the exterior housing 1 can be obtained by means enabling the disassembly of these parts when necessary, for example, the lower part can be embedded in the upper part and retained in it by means of flexible assembly tabs featuring a retaining nose hooking itself on the lower edge of the lower part base.

The hemispherical sliding bowl 1B constituting the lower part of the exterior housing 1 can be assembled at the base of its upper part 1A by any suitable quick fastening means not requiring any tools. This sliding bowl allows the cutting head to make contact with the ground, so as to facilitate the utilization of the devices equipped with this head, while maintaining the cutting blade at a distance of a few centimeters above the ground.

Preferably, the low part of the side wall of the upper part 1A of the exterior housing 1 and the circular upper part of the sliding bowl 1B, are provided with complementary retaining means the assembly of which requires only a relative axial movement, of the two parts, followed by a rotational movement of limited amplitude enabling the engagement of the complementary elements of said retaining means.

The internal surface of the cylindrical side wall of the upper part 1A of the exterior housing 1 is for instance provided, near and along its circular lower edge 21, with at least two rounded shoulders 22 (FIG. 11A) which, according to the embodiment shown, are diametrically opposed.

Figure 11A:
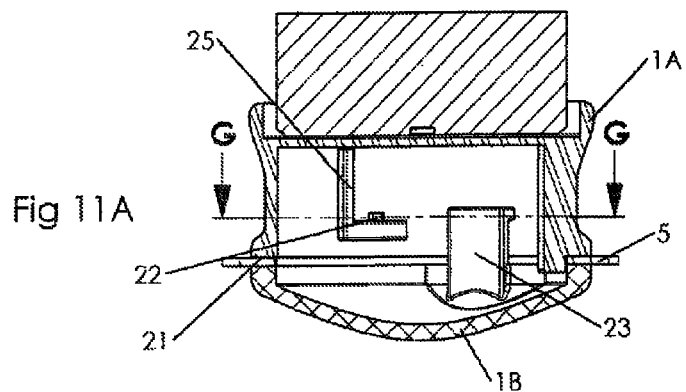
FIG. 11A is a cross-section along line Q-Q of FIG. 10A when the sliding bowl is unlocked.
Figure 11B:
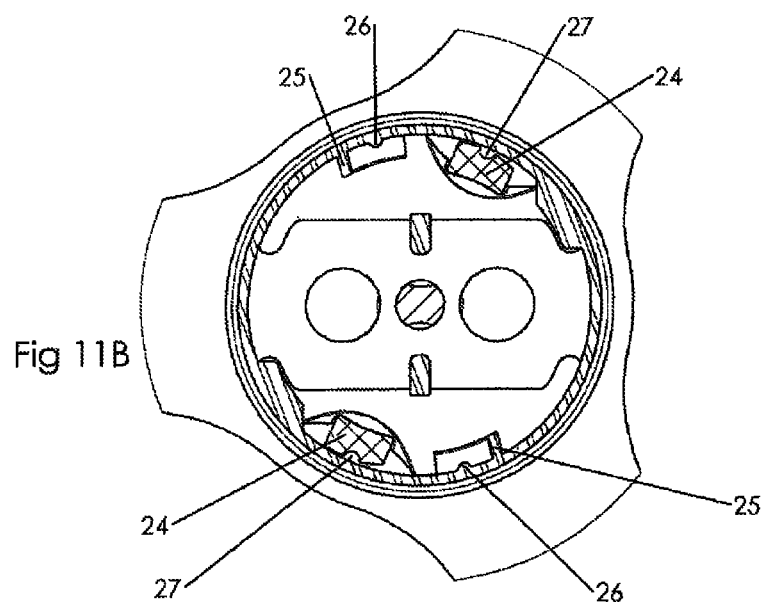
FIG. 11B is a cross-section along line G-G of FIG. 11A.
Figure 12A:
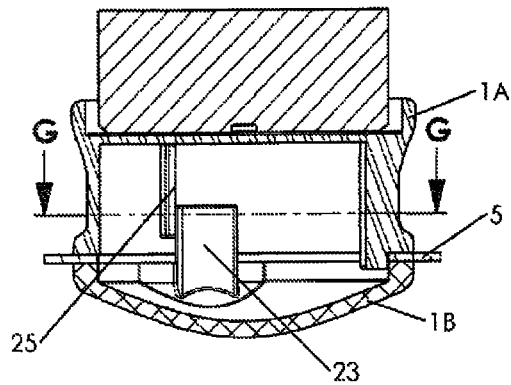
FIG. 12A is a cross-section along line Q-Q de FIG. 10A when the sliding bowl is blocked.
Figure 12B:
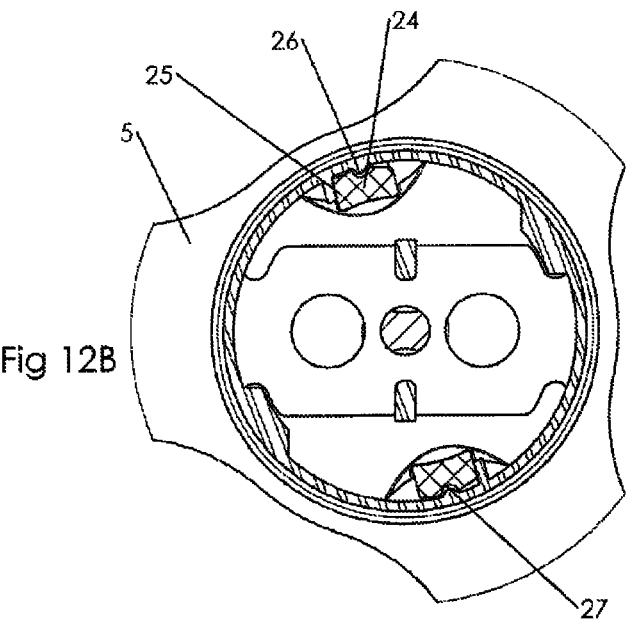
FIG. 12B is a cross-section along line G-G de FIG. 12A.

On the other hand, the sliding bowl 1B is provided with at least two diametrically opposed booking tabs 23 extending parallel to the axis of the bowl and the free end of which is provided with a nose or locking pin 24 oriented in the direction of this axis (FIGS. 11A, 11B).

A stop 25 located at one of the ends of each shoulder 22 limits the rotary movement of the noses or locking pins 24 during the placement of the sliding bowl 1B in the position of assembly.

On the other hand, the edge of nose 24 and the rounded shoulder 22 of the noses are provided with complementary locking means, at the end of the rotational movement, during the assembly of parts 1A and 1B of the exterior housing 1. These means may be constituted by a locking pin 26 on the upper face of the shoulders 22 and by a notch 27 provided, in the outer edge of the nose 24 and in which said locking pin engages at the end of the rotary movement of assembly.

According to the invention, the installation and removal of an interchangeable mobile blade on a cutting head is easily understood after the preceding disclosure.

Figure 1:
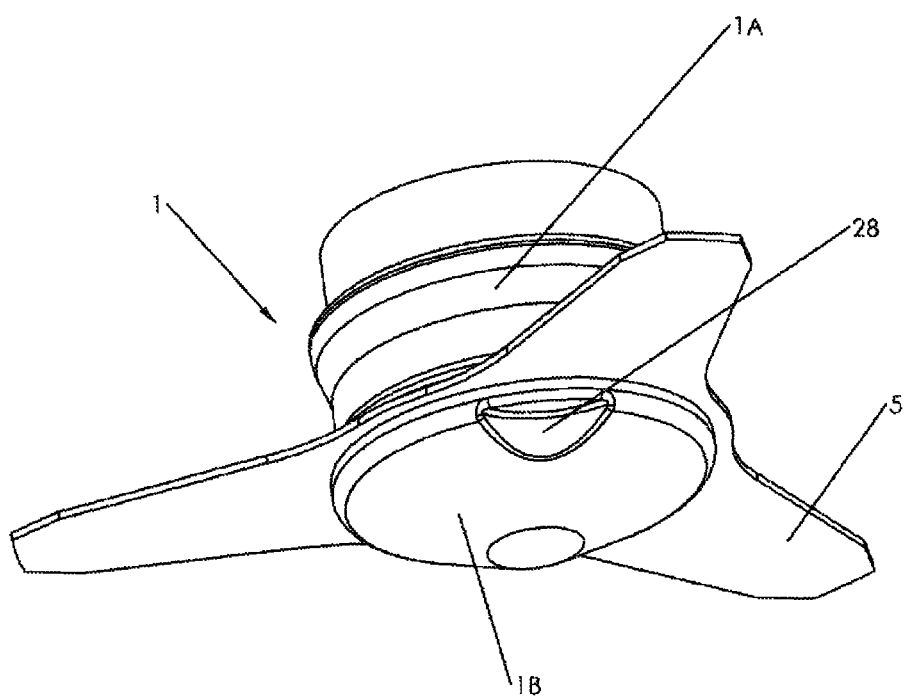
FIG. 1 is a perspective view of a cutting head using an interchangeable cutting blade, according to the invention.
Figure 2:
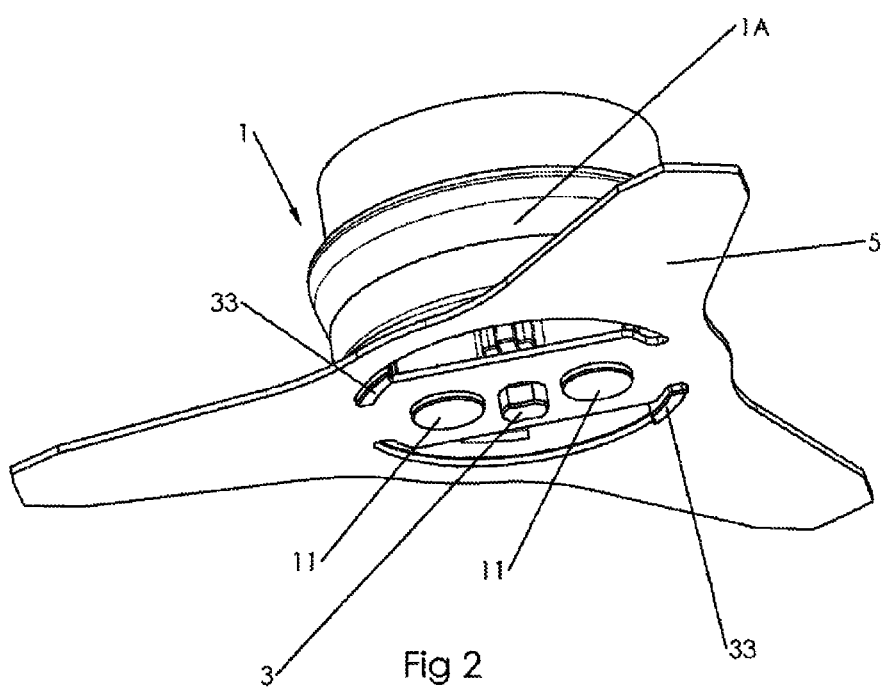
FIG. 2 is a perspective view of this cutting head, from which the lower pan or sliding bowl has been disassembled.
Figure 7C:
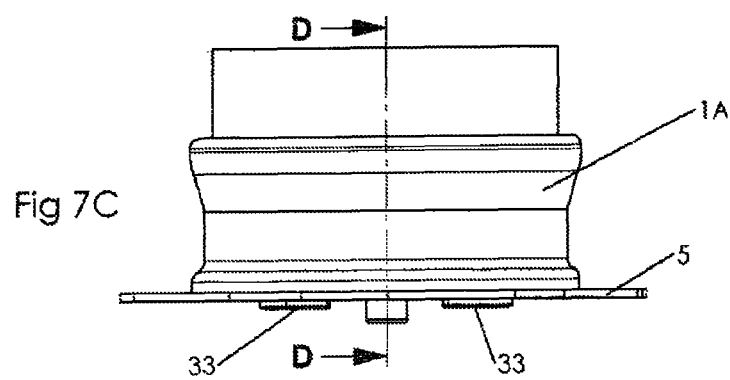
FIG. 7C is an exterior view of FIG. 7A without the sliding bowl.
Figure 8A:
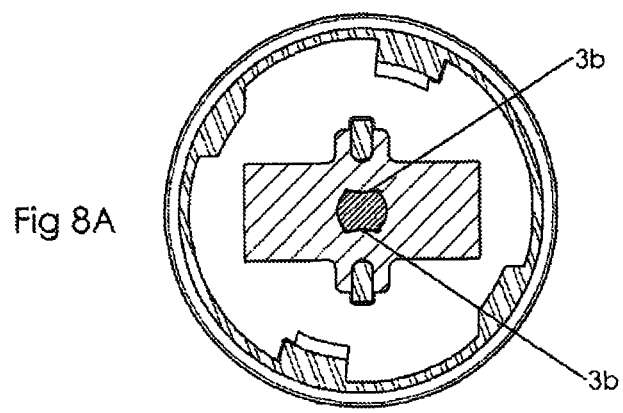
FIG. 8A is a cross-section along line E-E of FIG. 8B.
Figure 8B:
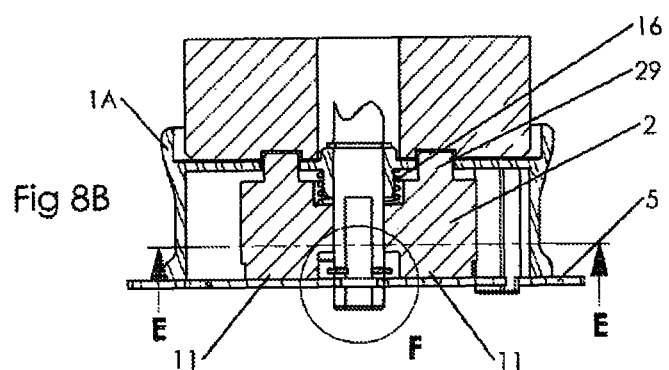
FIG. 8B is a cross-section along line D-D of FIG. 10.
Figure 8C:
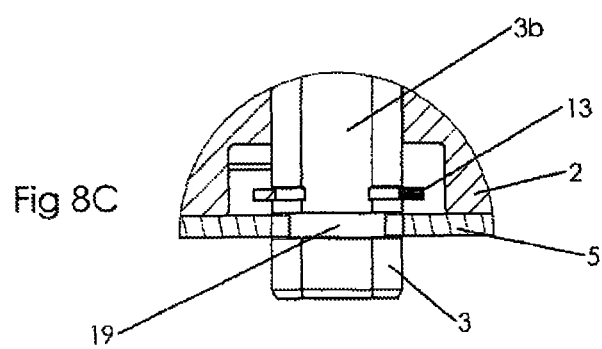
FIG. 8C is a detail view according to mark F of FIG. 8B.
Figure 9A:
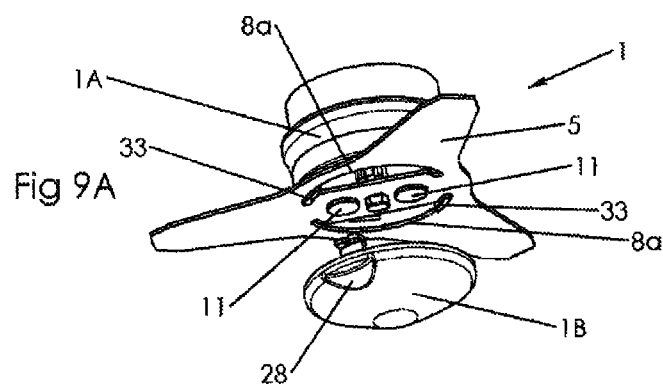
FIG. 9A is a perspective view showing the fourth phase of positioning of the metal blade, in locked position.
Figure 9B:
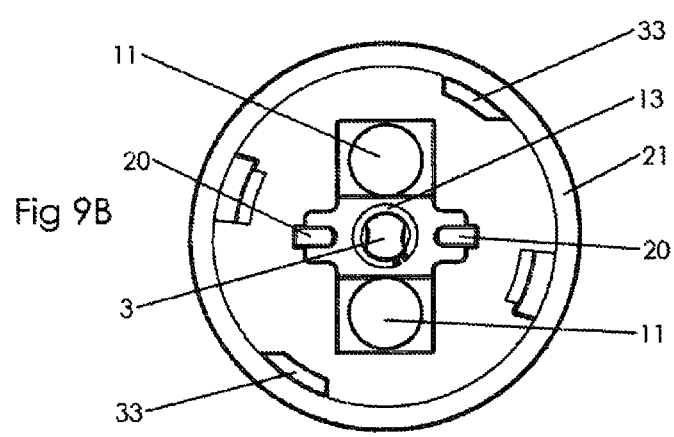
FIG. 9B is a bottom view of FIG. 9A.
Figure 9C:
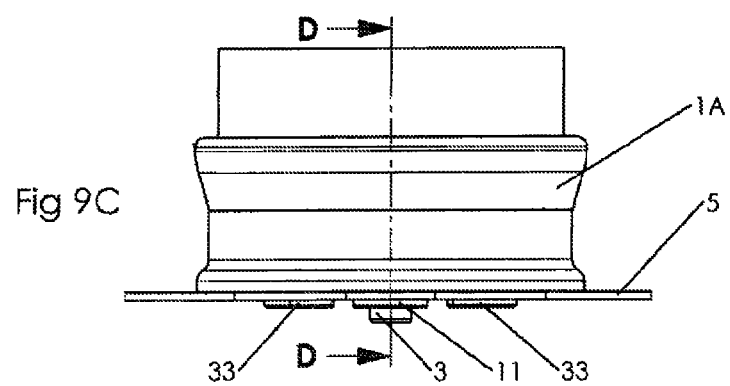
FIG. 9C is an exterior view of FIG. 9A without the sliding bowl.

It involves a cutting blade of the type especially shown in FIGS. 2, 5B and 7B:

the sliding bowl 1B is withdrawn by a rotary movement, in order to disconnect the shoulders 22 and the locking tabs 23; the hemispherical external face featuring two diametrically opposed indentations 28 facilitates this manipulation;

the blade 5 is placed on the distal end of the drive shaft 3 (only one position is possible because of the complementary profile of said end and the axial opening 6 of the blade 5); in this position the cutting blade rests on the studs 11 of the blade support 2;

an approaching or convergent movement is imparted on the blade support 2 and the exterior housing 1, by exerting manual pressure on the cutting blade 5 which rests on the drive studs 11 of the blade support, until said blade 5 is brought up to the level of groove 19; it is noticed that, during this action, the drive studs 11 of the blade support 2 find themselves pushed against solid parts of the blade distant by 90° from the coupling orifices 7. In practice, this approaching convergent movement obtained by pushing on the blade 5, has the effect of displacing the blade support 2, against the antagonistic action of the spring 16.

a rotary movement in the order of 90° is imparted to the blade. During this action (FIGS. 7A, 7B, 7C), the blade is guided by arched openings 8 in which the centering tabs 33 slide, integral with the base of the exterior housing 1A. At the end of this rotary movement, the coupling studs 11 penetrate automatically, under the action of the spring 16, into the coupling orifices 7, the blade support 2 moves axially along the drive axis 3 under the action of the compression spring 16 until it rests against the retaining circlip 13 of said drive axis.

It is noticed that in order to facilitate the detachment action of the blade or the installation of a replacement blade, the cutouts 6, 7, 8 and the solid parts 5C, constituting the central pans of the blades according to the invention are dimensioned and fitted so they make it possible to either maintain in the distant position the coupling studs 11 and the coupling orifices 7 counter to the pressure exerted by the spring 16, or the automatic penetration into the coupling orifices 7 under the pressure of said spring.

To facilitate keeping the blade support 2 in a fixed position during this rotational action of the blade 5, said blade support 2 is provided, on its upper face with two tenons 29 (FIG. 6B) which, during the upward displacement of said cutting blade, engage in two holes 30 on the upper partitioning 4 of the exterior housing 1 in order to engage in the orifices 31 made in the fixed support 32 of the cutting head 1 serving as motor housing 37, which prevents the rotation of said blade support 2 during this action.

The sliding bowl 1B is put back in place with an axial movement and then a rotation of said sliding bowl 1B relative to the exterior housing 1.

To carry out the retraction of the blade 5, the sliding bowl 1B must be raised, and then it is necessary to push manually on the coupling studs 11 of the blade support 2 to withdraw them from the orifices 7 of the blade 5 and perform a rotation of said blade 5 by about 90°.

The drive studs find themselves once more against the solid parts of the cutting blade 5 and the lobes 5A engaged in the grooves 3D of the distal part 3A of the drive shaft 3, whereby the cutting blade 5 is able to move automatically in the direction of the distal end of the drive shaft 3 until its disengagement from said drive shaft 3, wider the action of the blade support 2 which is acted upon by the compression spring 16.

In another constructive solution (FIGS. 21A, 21B, 21C, 21D), the internal surface of the cylindrical side wall of the exterior housing 1A near and along its circular lower edge 21 is provided with at least two rounded shoulders 42 which, according to the embodiment shown, are diametrically opposed.

On the other hand, the sliding bowl 1B is provided, with a spring piece made of steel wire 40, fastened by at least two screws 41, forming at least two diametrically opposed hooking tabs 43 extending perpendicularly to its axis, and their free, essentially U-shaped ends serve as locking pins 44.

During the rotation of the sliding bowl 1B around its axis, the locking pins 44 come to rest on the shoulders 42 thus limiting the translation movement of said sliding bowl relative to the exterior housing 1A.

A stop 45 located at one of the ends of each shoulder 42 limits the rotary movement of the locking pins 44 during the placement of the sliding bowl 1B into the position of assembly.

On the other hand, the locking pins 44 and the lower face of the upper part 11A of the exterior housing 1 are provided with complementary locking means at the end of the rotational movement, during the assembly of the parts 1A and 1B of the exterior housing 1. These means may be constituted, by the U shape of the locking pins 44 and by the diametrically opposed stubs 47, provided inside of exterior housing 1A delimiting, with the stop 45, two seats 46 in which said locking pins engage automatically at the end of the rotary movement of assembly.

Figure 13:
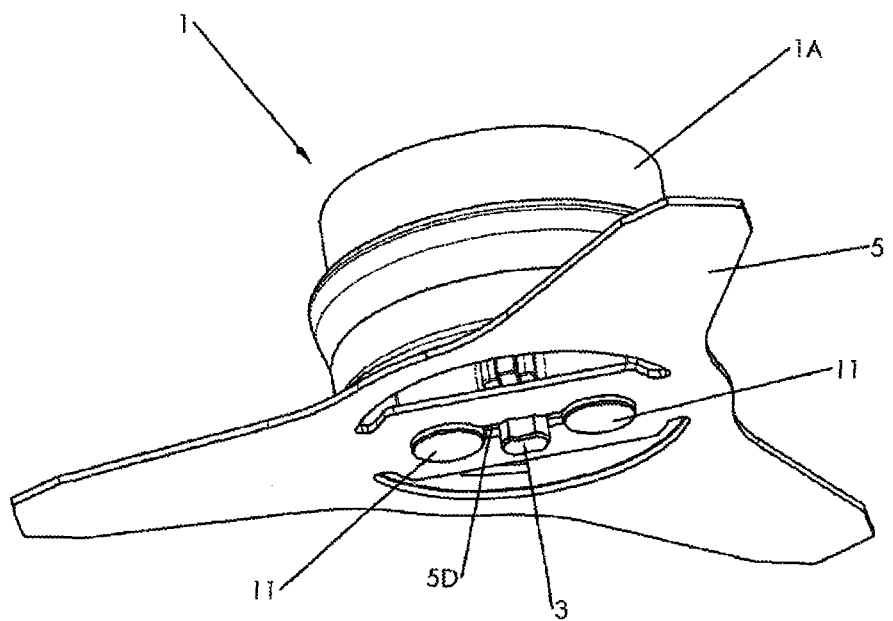
FIG. 13 is a perspective view of the coning head from which the lower part or sliding bowl has been removed, said cutting head being equipped with a variant of the cutting blade.
Figure 13A:
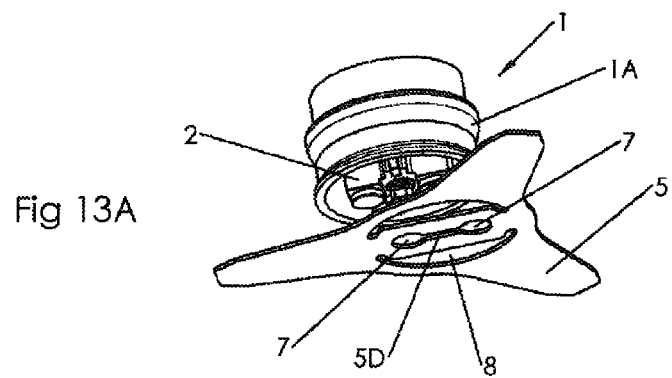
FIG. 13A is a perspective view showing the first phase of positioning, manually, a metal blade on or against the lower face of the upper part of the exterior housing, according to FIG. 13.
Figure 13B:
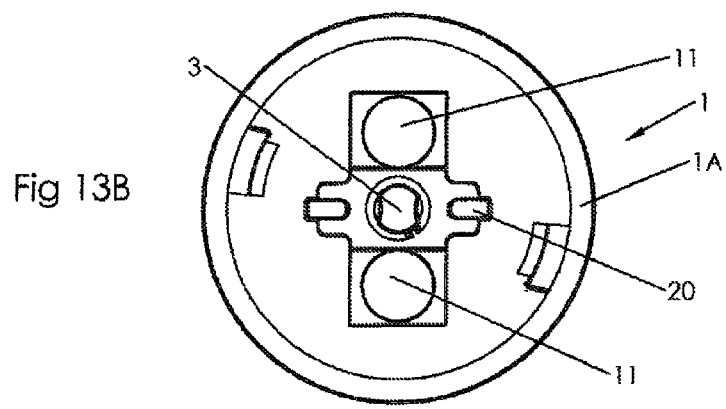
FIG. 13B is a bottom view of FIG. 13A, after retraction of the cutting blade and the sliding bowl.
Figure 13C:
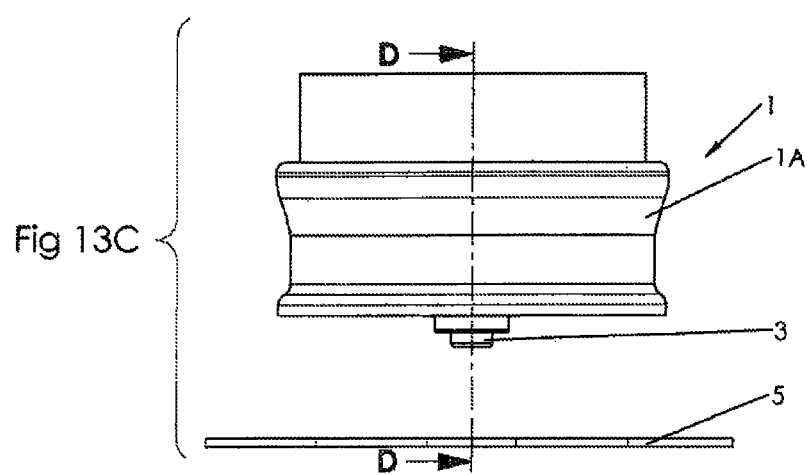
FIG. 13C is an exterior exploded, view of FIG. 13A without the sliding bowl.
Figure 14A:
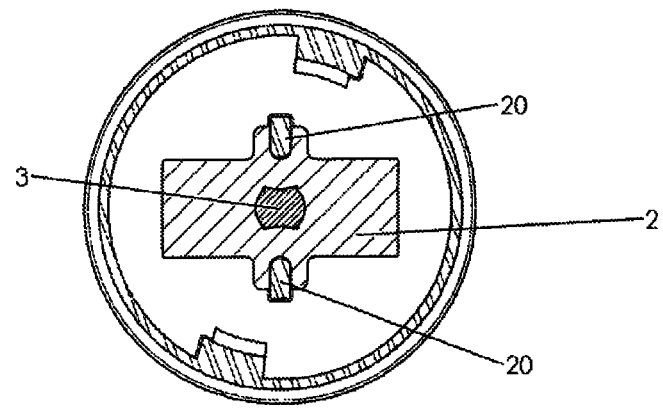
FIG. 14A is a bottom view and cross-section along line E-E of FIG. 14B.
Figure 14B:
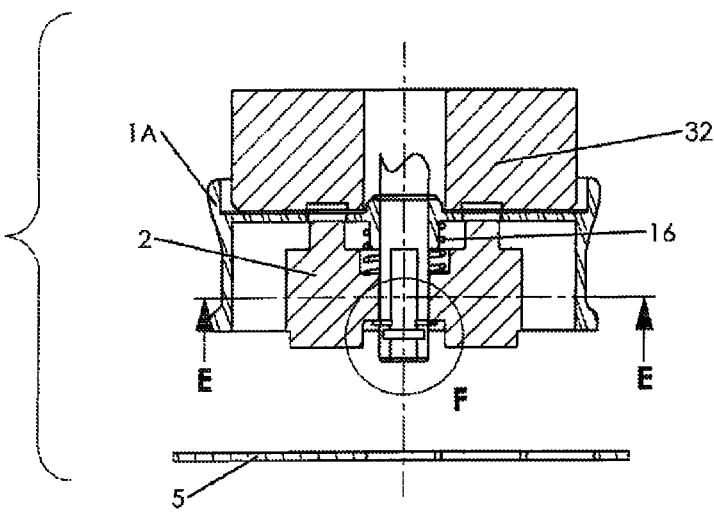
FIG. 14B is a cross-section along line D-D de FIG. 13C.
Figure 14C:
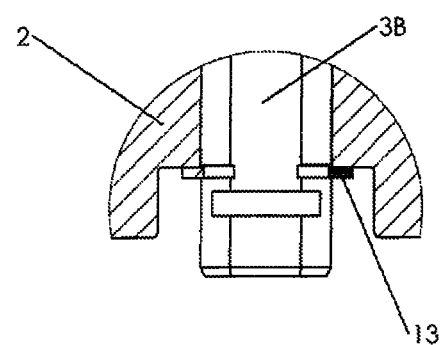
FIG. 14C is a detail view according to mark F of FIG. 14B.
Figure 16A:
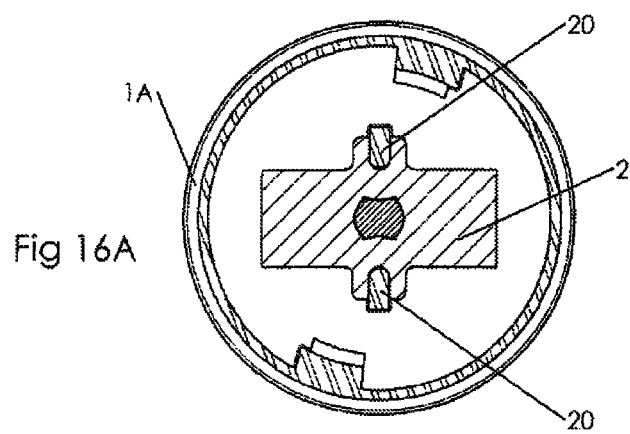
FIG. 16A is a detail view and cross-section along line E-E of FIG. 16B.
Figure 16B:
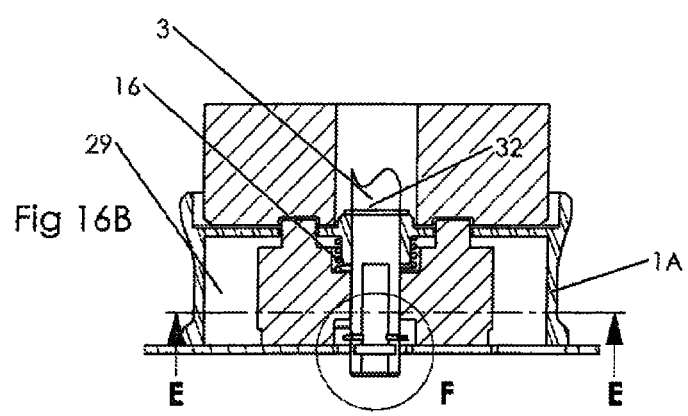
FIG. 16B is a cross-section along line D-D of FIG. 15C.
Figure 16C:
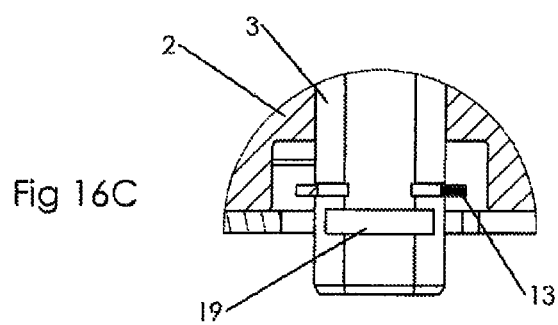
FIG. 16C is a detail view according to mark F of FIG. 16B.
Figure 18A:
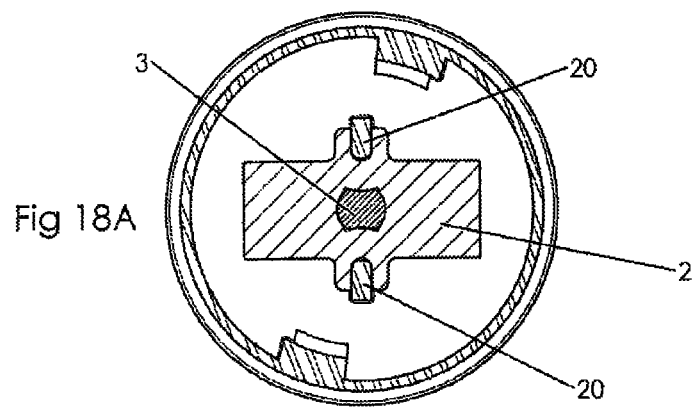
FIG. 18A is a cross-section along line E-E of FIG. 18B.
Figure 18B:
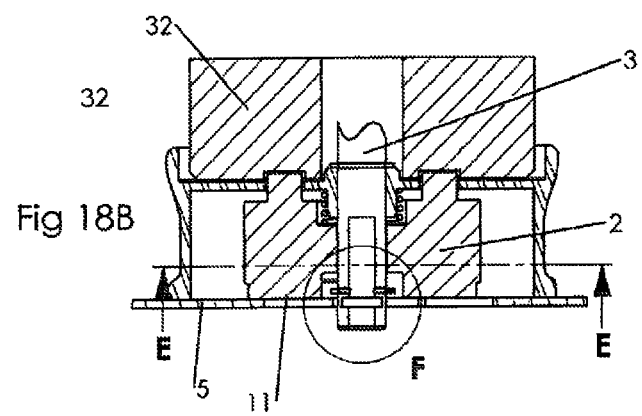
FIG. 18B is a cross-section along line D-D of FIG. 17C.
Figure 18C:
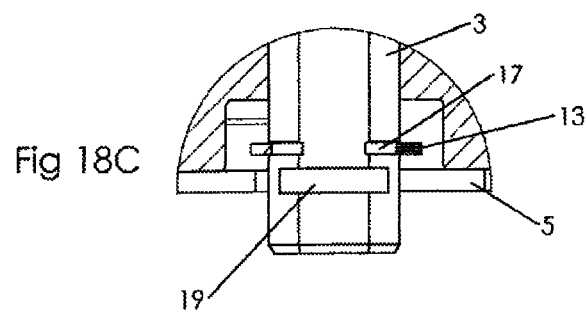
FIG. 18C is a detail view according to mark F of FIG. 18B.
Figure 20A:
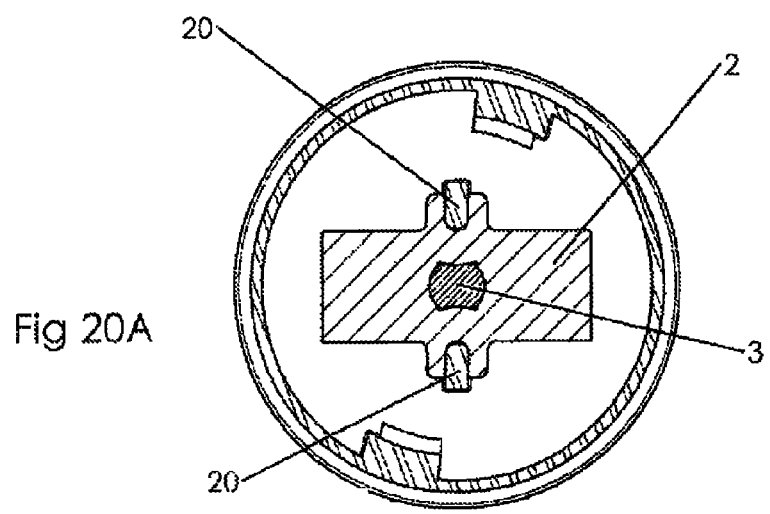
FIG. 20A is a cross-section along, line E-E of FIG. 20B.
Figure 20B:
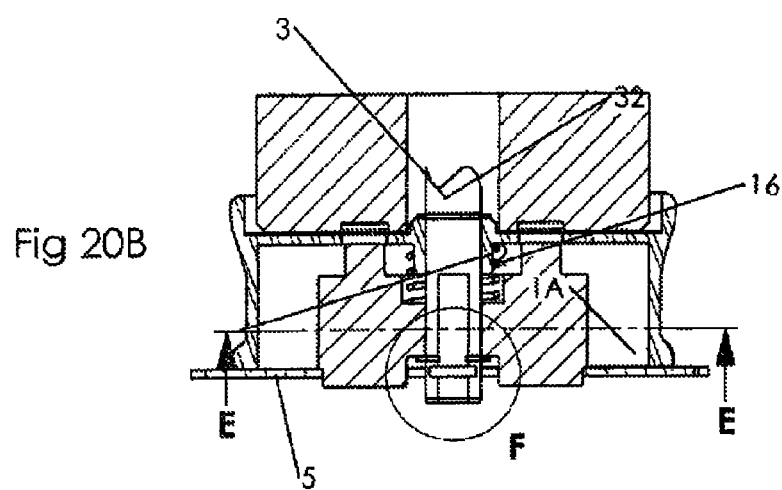
FIG. 20B is a cross-section along line D-D of FIG. 19C.
Figure 20C:
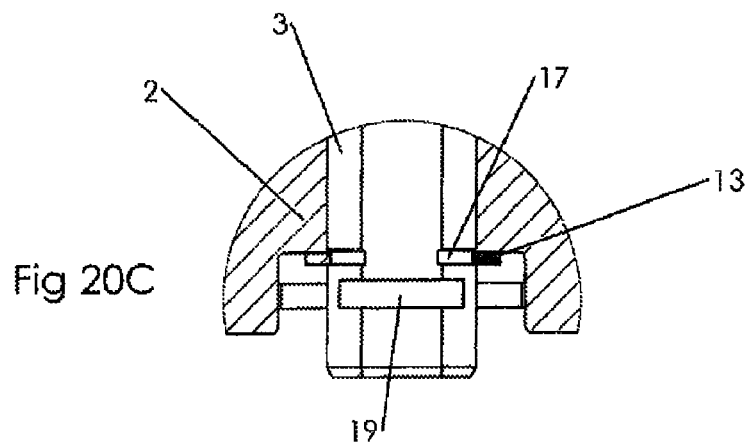
FIG. 20C is a detail view according to mark F of FIG. 20B.

For installation of a cutting blade shown in FIGS. 13, 15B et 17B:
- one of the orifices 7 of said blade is positioned facing one of the coupling studs 11;
- pressure is exerted on said blade which, through the intermediary of its solid pans makes it possible to push back the assembly constituted by the blade support 2 and the coupling studs 11, against the antagonistic action exerted by the spring 16, until the slot 5D is brought up to the level of the ring-shaped groove 19 on the distal portion of the drive shaft 3;
- a linear push is manually imparted on the blade 5 so that the longitudinal edges of the slot 5D slide in the ring-shaped groove 19 until the two coupling studs 1 face the two orifices 7 of the blade; the assembly constituted by the blade support 2 and the coupling studs 11 finds itself pushed back; said studs being able to automatically engage in said orifices while ensuring the automatic claw coupling of blade 5 and the blade support 2 and, consequently, of the exterior housing 1 integral in rotation with said blade support 2.

The invention also concerns portable cutting devices such as for example grass cutter, edge cutter, brush, cutter, hedge trimmer, provided with, or capable of being equipped with, a cutting head featuring the previously disclosed characteristics.

Figure 22:
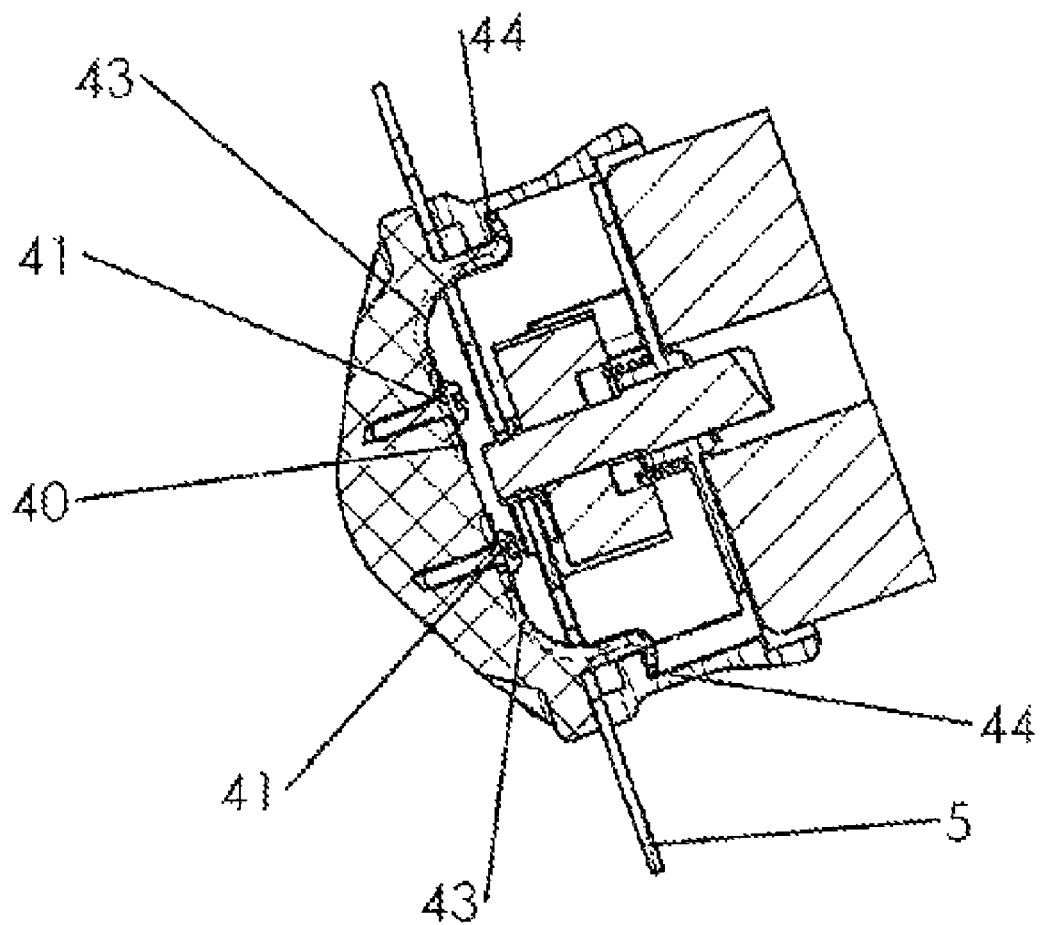
FIG. 22 is a cross-section along line U-U of FIG. 21D.
Figure 23:
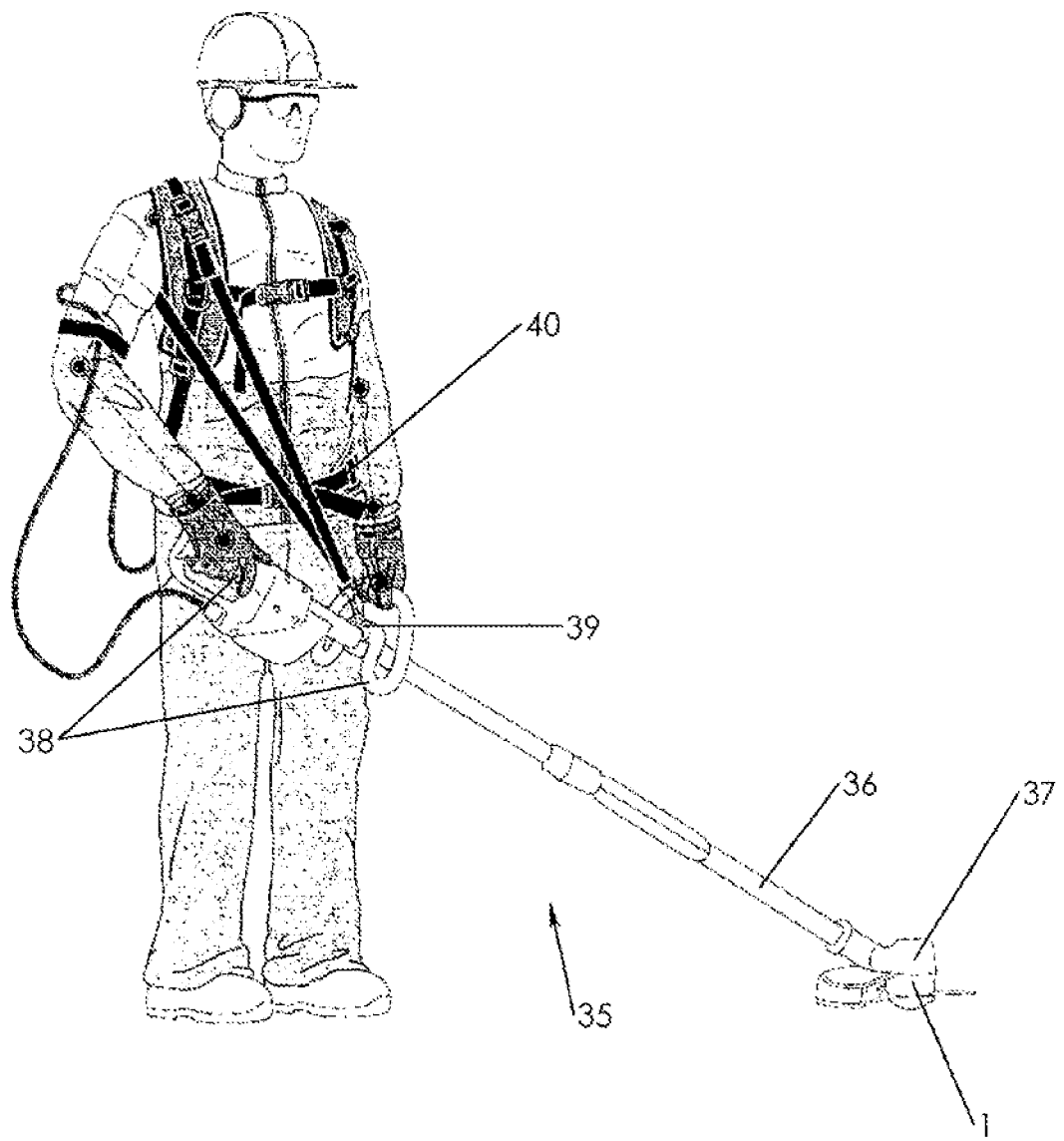
FIG. 23 is a perspective view of a grass cutter equipped with a cutting head using a metal blade, according to the invention.

Such devices, an example of which is designated in its entirety by reference 35 in FIG. 22, generally feature: a handle 36 the distal end of which supports the cutting head 1, a motorization 37 installed at the lower or upper part of the handle for the rotary drive of the cutting head, a U-shaped grip or double guide and control grip for this motorization, a ring 39 for fastening of a carrying harness 40. The drive motorization of the cutting head may be provided by a thermal motor or by an electric motor powered by a portable battery, or by connection to the net.

I claim:

1. A rotary coupling head for use with a portable cutting device, the rotary coupling head comprising:
    a blade-supporting housing;
    an axial motor drive shaft connected to said blade-supporting housing so as to be rotatable with said blade-supporting housing;
    an interchangeable cutting blade mounted on said blade-supporting housing so as to rotate with the rotation of said blade-supporting housing, said interchangeable cutting blade engaged around said drive shaft such that said interchangeable cutting blade and said blade-supporting housing are axially displaceable along said drive shaft; and
    a coupler on said blade-supporting housing and said interchangeable cutting blade that is automatically actuated upon the axial displacement of said interchangeable cutting blade and said blade-supporting housing on said drive shaft so as to position and rotationally couple said interchangeable cutting blade relative to said drive shaft until said coupler is released, said coupler being a claw coupling.

2. The rotary coupling head of claim 1, said blade-supporting housing further comprising:
    an exterior housing having an upper part and lower part, said lower part removably assembled onto a base of said upper part.

3. The rotary coupling head of claim 1, said blade having a pair of oblong holes each having an arched outer edge, said blade-supporting housing having an upper part and a lower part, said upper part diametrically-opposed centering and stop cleats on a base thereof.

4. The rotary coupling head of claim 1, said blade-supporting housing having an upper part and a lower part, said lower part being a sliding bowl, said sliding bowl having a circular upper portion, the rotary coupling head further comprising:
    a complementary retainer joining said upper part and said circular upper portion of said sliding bowl.

5. The rotary coupling head of claim 4, said complementary retainer having at least two diametrically-opposed rounded shoulders and at least two diametrically-opposed fastening hooks extending parallel to a sliding axis of said sliding bowl, said fastening hooks each having a free end that has a locking pin oriented along said sliding axis.

6. The rotary coupling head of claim 5, each of said rounded shoulders having a stop positioned at an end thereof so as to limit a rotational movement of the locking pins.

7. The rotary coupling head of claim 5, each of the rounded shoulders having a stub on an upper face thereof, said locking pin having a notch at an outer edge thereof, said stub automatically engaging said notch.

8. The rotary coupling head of claim 1, further comprising:
    a blade support seated in said blade-supporting housing so as to be rotatable with said drive shaft and said blade-supporting housing, said coupler cooperative with said interchangeable cutting blade and said blade support, said blade support axially displaceable along said drive shaft so as to cause said coupler to automatically couple between said interchangeable cutting blade and said blade-supporting housing.

9. The rotary coupling head of claim 8, further comprising:
a means for axially blocking said interchangeable cutting blade on a distal portion of said drive shaft.

10. The rotary coupling head of claim 8, said coupler comprising a pair of coupling studs positioned on an underside of said blade support on respective opposite sides of an axial opening formed in said blade support.

11. The rotary coupling head of claim 8, said coupler comprising a pair of coupling studs positioned on an underside of said blade support, said interchangeable cutting blade having an oblong hole and a pair of orifices formed therein.

12. The rotary coupling head of claim 11, said pair of orifices receiving said coupling studs therein.

13. The rotary coupling head of claim 8, said blade support coupled to said blade-supporting housing by drive fingers, said housing having an upper partition, said drive fingers integrally connected to said upper partition and oriented parallel to a rotation axis of said drive shaft, said drive fingers being slidable in guiding and coupling grooves formed laterally in said blade support.

14. The rotary coupling head of claim 13, said guiding and coupling grooves formed on at least two opposite sides of said blade support.

15. The rotary coupling head of claim 13, further comprising:
a spring interposed between said upper partition of said blade-supporting housing and said blade support.

16. The rotary coupling head of claim 8, said blade support having an axial passage formed therein, said drive shaft having a traversing portion extending through said axial passage, said axial passage and said traversing portion having respective complementary profiles.

17. The rotary coupling head of claim 16, further comprising:
a means for limiting of an amplitude of an axial translation of said traversing portion in said axial passage of said blade support.

18. The rotary coupling head of claim 8, said interchangeable cutting blade having an axial opening, said drive shaft having a ring-shaped groove on a distal portion thereof, said drive shaft having an end portion having a circular shape with two diametrically-opposed grooves, said axial opening having a profile complementary to a profile of said end portion.

19. The rotary coupling head of claim 8, said drive shaft having a ring-shaped groove at a distal portion thereof, said interchangeable cutting blade having an oblong hole having a width smaller than a diameter of said distal portion.

20. The rotary coupling head of claim 8, said blade support having a pair of stubs on an upper face thereof, said blade-supporting housing having an upper part with a pair of holes, said pair of stubs respectively engaging with said pair of holes.

21. The rotary coupling head of claim 8, said blade-supporting housing having a cylindrical side wall with a circular lower edge on an inner surface thereof, said blade-supporting housing having at least two diametrically-opposed rounded shoulders along said circular lower edge, said blade-supporting housing having an upper part and a lower part, said lower part having a spring piece fastened by a pair of springs, said spring piece forming at least two diametrically-opposed hooks extending perpendicular to an axis of said lower part, said spring piece having U-shaped free ends.

22. The rotary coupling head of claim 21, each of said rounded shoulders having a stop at one end thereof so as to limit a rotational movement of said free ends.

23. The rotary coupling head of claim 22, said blade-supporting housing having diametrically-opposed stubs and a pair of seats formed therewithin, said free ends automatically respectively engaging with said pair of seats.

24. A portable cutting device comprising the rotary coupling head of claim 1.

* * * * *